(12) United States Patent
Lin et al.

(10) Patent No.: US 12,508,409 B2
(45) Date of Patent: Dec. 30, 2025

(54) SYSTEM AND METHOD TO USE SUCTION TO ENHANCE PERMEABILIZATION AND TRANSFECTION OF CELLS

(71) Applicant: Rutgers, The State University of New Jersey, New Brunswick, NJ (US)

(72) Inventors: Hao Lin, Montgomery, NJ (US); Jonathan P. Singer, New Brunswick, NJ (US); David I. Shreiber, New Brunswick, NJ (US); Jerry W. Shan, New Brunswick, NJ (US); Jeffrey D. Zahn, New Brunswick, NJ (US); Emran O. Lallow, New Brunswick, NJ (US); Juliet M. Melnik, New Brunswick, NJ (US); Nandita Chakrabarty Jhumur, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 1231 days.

(21) Appl. No.: 17/306,881

(22) Filed: May 3, 2021

(65) Prior Publication Data
US 2021/0338571 A1 Nov. 4, 2021

Related U.S. Application Data

(60) Provisional application No. 63/019,933, filed on May 4, 2020.

(51) Int. Cl.
*A61M 37/00* (2006.01)
*A61K 9/00* (2006.01)
*A61K 39/00* (2006.01)

(52) U.S. Cl.
CPC ....... *A61M 37/0015* (2013.01); *A61K 9/0021* (2013.01); *A61K 39/00* (2013.01);
(Continued)

(58) Field of Classification Search
CPC .. A61K 9/0021; A61K 39/00; A61K 2039/53; A61K 39/12; A61K 2039/54;
(Continued)

(56) References Cited

U.S. PATENT DOCUMENTS 6,234,990 B1 * 5/2001 Rowe ............... A61B 5/150389
604/22
6,537,242 B1 * 3/2003 Palmer ............. A61M 37/0015
600/583

(Continued)

FOREIGN PATENT DOCUMENTS

CN 105979987 A 9/2016
CN 107412943 A * 12/2017 ............ A61M 37/00
(Continued)

OTHER PUBLICATIONS

International Preliminary Report on Patentability for International Application No. PCT/US2021/030513 entitled System and Method to Use Suction to Enhance Permeabilization and Transfection of Cells, mailed on Nov. 8, 2022.
(Continued)

*Primary Examiner* — Kami A Bosworth
(74) *Attorney, Agent, or Firm* — Hamilton, Brook, Smith & Reynolds, P.C.

(57) ABSTRACT

A method and apparatus for promoting the delivery of a molecule across a cell membrane comprises delivering a molecule to a delivery site of a region of tissue surrounding the cell membrane. A suction component applies a suction through a suction tip that surrounds the surface of the delivery site creating a seal to promote delivery of the
(Continued)

molecule across the cell membrane. The application of the suction is controlled to create a predetermined negative pressure for a predetermined period of time before releasing the negative pressure. Suction is used to enhance permeabilization and transfection of cells. The technique can be used to enhance the uptake and subsequent transfection and expression of plasmid DNA vaccines, mRNA vaccines and other nucleic acid molecules, that are introduced subcutaneously. It can be used in combination with coated microneedles.

20 Claims, 30 Drawing Sheets
(7 of 30 Drawing Sheet(s) Filed in Color)

(52) U.S. Cl.
CPC .. *A61K 2039/53* (2013.01); *A61M 2037/0007* (2013.01); *A61M 2037/0023* (2013.01)

(58) Field of Classification Search
CPC .. A61B 17/20; A61B 17/205; A61M 37/0015; A61M 2037/0007; A61M 2037/0023; A61M 2037/0046; A61M 2037/0061; A61M 2037/003; A61P 31/14; C12N 2770/20034
See application file for complete search history.

(56) References Cited

U.S. PATENT DOCUMENTS

| | | | | |
|---|---|---|---|---|
| 6,589,202 | B1* | 7/2003 | Powell | A61B 17/205 604/890.1 |
| 6,743,211 | B1* | 6/2004 | Prausnitz | A61B 5/150083 604/173 |
| 8,915,894 | B1* | 12/2014 | Lonky | A61M 37/00 604/289 |
| 2002/0111600 | A1* | 8/2002 | Cormier | A61B 17/205 606/186 |
| 2003/0078499 | A1 | 4/2003 | Eppstein | |
| 2004/0092875 | A1 | 5/2004 | Kochamba | |
| 2005/0137531 | A1 | 6/2005 | Prausnitz et al. | |
| 2008/0213461 | A1* | 9/2008 | Gill | A61K 9/0021 427/2.3 |
| 2008/0294116 | A1* | 11/2008 | Wolter | A61K 9/0021 604/173 |
| 2011/0118698 | A1* | 5/2011 | Eckhoff | A61B 5/1116 604/503 |
| 2012/0004626 | A1* | 1/2012 | Kuwahara | A61L 27/00 604/272 |
| 2017/0035975 | A1* | 2/2017 | Myung | A61M 35/003 |
| 2021/0290941 | A1* | 9/2021 | Fisher | A61N 1/0412 |

FOREIGN PATENT DOCUMENTS

| | | | |
|---|---|---|---|
| EP | 3090771 A1 | 11/2016 | |
| JP | 2009-57329 A | 3/2009 | |
| JP | 4786152 B2 | 5/2011 | |
| JP | 11505112 A | 5/2011 | |
| JP | 2021-502180 A | 1/2021 | |
| WO | 96/34967 A1 | 11/1996 | |
| WO | 99/44678 A1 | 9/1999 | |
| WO | 2005/077317 A1 | 8/2005 | |
| WO | 2012/056756 A1 | 5/2012 | |
| WO | WO-2013036115 A1 * | 3/2013 | .......... A61B 17/205 |
| WO | 2014/064534 A2 | 5/2014 | |
| WO | 2019/092436 A1 | 5/2019 | |

OTHER PUBLICATIONS

Shimizu Kazunori et al: "Liver Suction-Mediated Transfection in Mice Using a Pressure-Controlled Computer System", Biological & Pharmaceutical Bulletin, vol. 37, No. 4, pp. 569-575, Apr. 2014.

Qiu Yuclin et al: DNA-based vaccination against hepatitis B virus using dissolving microneedle arrays adjuvanted by cationicl iposomes and CpG ODN't, Jan. 27, 2015 (Jan. 27, 2015) pp. 2391-2397.

Invitation to Pay Additional Fees, International Application No. PCT/US2021/030513, entitled "System and Method to Use Suction to Enhance Permeabilization and Transfection of Cells", mailed Aug. 12, 2021.

PCT International Search Report and Written Opinion for International Application No. PCT/US2021/030513 entitled System and Method to Use Suction to Enhance Permeabilization and Transfection of Cells, mailed on Oct. 4, 2021.

Shimizu Kazunori et al, "In vivo Site-Specific Transfection of Naked Plasmid DNA and siRNAs in Mice by Using a Tissue Suction Device", PLoS ONE, www.plosone.org, vol. 7, issue 7, Jul. 2012.

Yota Taniguchi, et al, "Tissue suction-mediated gene transfer to the beating in mice", published Feb. 6, 2020, https://doi.org/10.1371/journal.pone.0228203.

Pearton, M., et al., "Microneedle delivery of plasmid DNA to living human skin: Formulation coating, skin insertion and gene expression", Journal of Controlled Release, vol. 160, No. 3, Jun. 28, 2012, pp. 561-569.

* cited by examiner

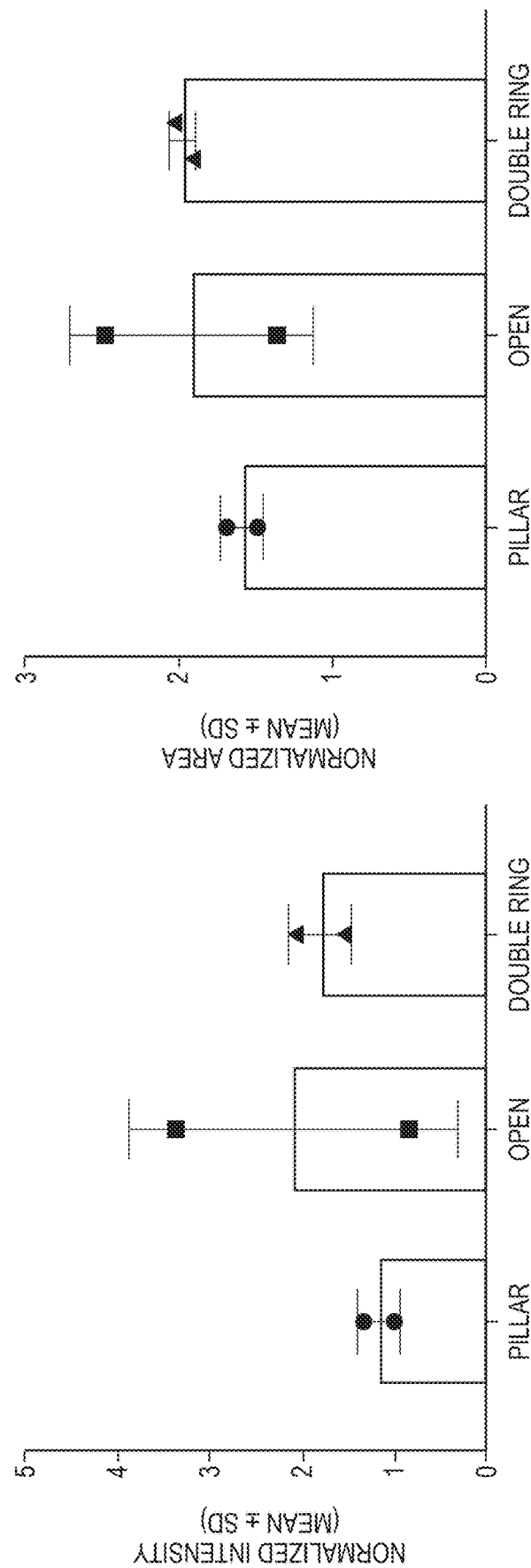

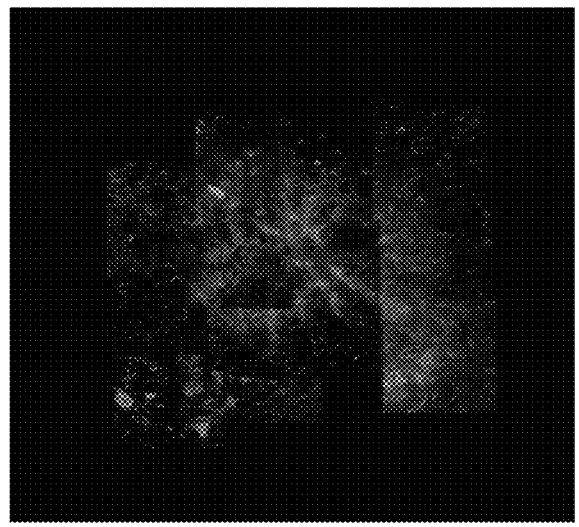
FIG. 26C PILLAR
FIG. 26B DOUBLE RING
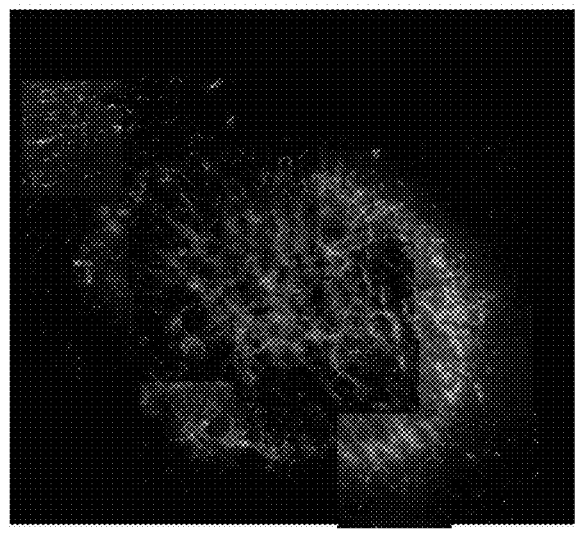
FIG. 26A OPEN-RING

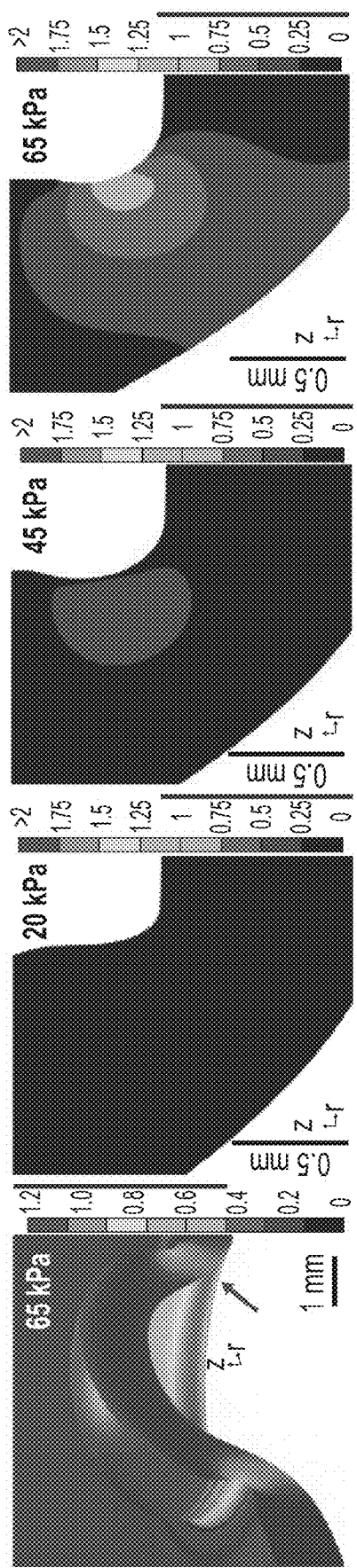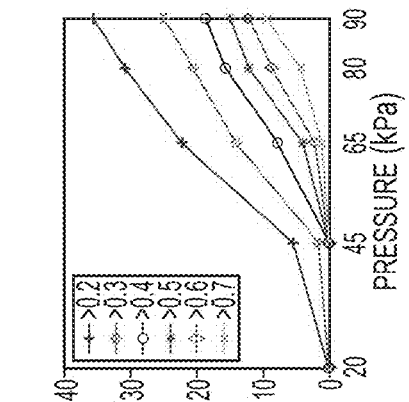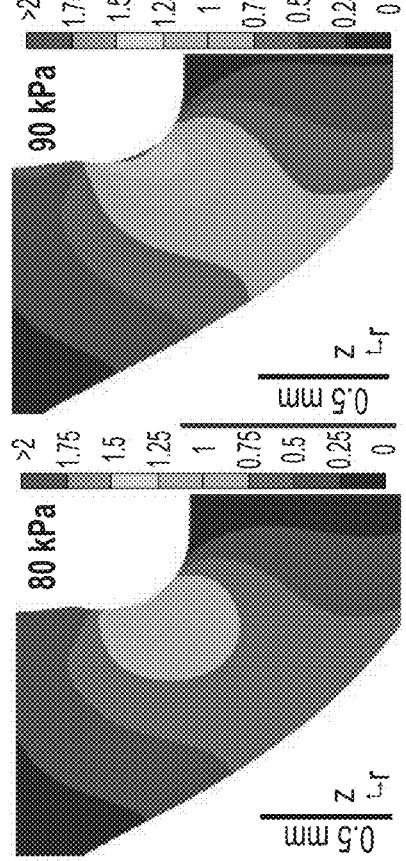
FIG. 29A  FIG. 29B  FIG. 29C  FIG. 29D
FIG. 29E  FIG. 29F  FIG. 29G  FIG. 29H

SYSTEM AND METHOD TO USE SUCTION TO ENHANCE PERMEABILIZATION AND TRANSFECTION OF CELLS

RELATED APPLICATION

This application claims the benefit of U.S. Provisional Application No. 63/019,933, filed on May 4, 2020. The entire teachings of the above application are incorporated herein by reference.

BACKGROUND

Vaccination provides effective containment for disease spreading in a situation of an emerging pandemic/epidemic. Among common vaccination approaches, DNA vaccines have a proven safety record, and are particularly attractive due to short development cycles (such as two months or even less) from design to batch manufacturing. Nevertheless, a major bottleneck preventing this general approach from mass application is that in the delivery, cells need to be transfected in vivo to produce the target antigens in sufficient quantities, which in turn induces immunogenicity.

The current state-of-the-art is a specialized electroporation device that is costly and difficult to manufacture, has limited transfection efficiency, and can cause trauma to the skin. Transdermal electroporation has traditionally been applied either as a surface electrode or as penetrating electrodes which are inserted into skin or muscle. When a surface electrode is used, a high intensity electric field is required to permeabilize the highly keratinized stratum corneum; the outmost barrier layer of the skin. Amongst the problems encountered during dermal electroporation, low delivery efficiencies coupled with skin irritation and scarring are the most prominent obstacles to be addressed. Therefore, there is an ongoing need for improved techniques of promoting delivery of a molecule through permeabilization and transfection of cells.

SUMMARY

In accordance with an embodiment of the invention, suction is used to enhance permeabilization and transfection of cells. The technique can, for example, be used to enhance the uptake and subsequent transfection and expression of plasmid DNA vaccines, and other nucleic acid molecules, that are introduced subcutaneously. It can be used in combination with coated microneedles.

One embodiment is a method of promoting delivery of a molecule across a cell membrane. The method comprises delivering the molecule to a region of tissue surrounding the cell membrane, surrounding the surface of the delivery site with a suction seal, and applying suction to the surface of the delivery site to promote the delivery of the molecule across the cell membrane. The suction is controlled to create a predetermine negative pressure for a predetermined period of time, and then the negative pressure is released.

In further, related embodiments, delivering the molecule to the tissue may comprise delivering the molecule transcutaneously. Delivering the molecule may comprise delivering a nucleic acid, such as a nucleic acid vaccine, for example a plasmid DNA vaccine or an mRNA vaccine. The molecule may be delivered to an epidermal or dermal layer of skin. A microneedle, or array of microneedles, may be inserted through a surface of the skin to deliver the molecule transcutaneously. A surface of the microneedle may comprise a coating that includes the molecule, such as a dried nucleic acid vaccine. The coating may also include a matrix material. The matrix material may comprise at least one of a polysaccharide, a protein, an enzyme, and a water soluble polymer. For example, the matrix material may comprise a polysaccharide such as trehalose or a water soluble polymer such as poly (vinyl pyrrolidone). The microneedle may be inserted into the skin so that the molecule is delivered to a depth of 2 mm or less under the surface of the skin, such as a depth of 1 mm or less under the surface of the skin. Delivering the molecule transcutaneously may comprise injecting the molecule through a surface of the skin. In yet another embodiment, delivering the molecule to the tissue may comprise applying a patch to a surface of the tissue, the patch comprising a microneedle coated with the molecule.

Applying suction to the surface of the tissue may comprise applying a pressure of less than about 101 kPa to the surface of the tissue, such as between about 1 kPa and about 50 kPa, for example between about 1 kPa and about 10 kPa, further such as between about 1 kPa and about 5 kPa. In some embodiments, applying a suction to create a predetermined negative pressure includes, for example a negative pressure between 40 kPa and 90 kPa. Applying the suction may promote the delivery of the molecule across the cell nuclear membrane; and applying the suction may promote permeabilization of the cell membrane and transfection and expression of a nucleic acid molecule in the tissue. The method may further comprise performing electroporation of the tissue. Applying suction to the surface of the tissue may be delayed for a time after delivering the molecule to the tissue, such as a time sufficient to promote hydrating and dispersing of a dried molecule into the tissue, for example a time of less than thirty minutes, such as less than five minutes, and such as less than one minute. Applying suction may, for example, be performed for less than thirty minutes, such as less than five minutes, and such as less than one minute. In some embodiments, the suction may be configured to apply the negative pressure for a predetermined period of time between 1 and 40 seconds, for example approximately 30 seconds. In some embodiments, a cycle of applying suction to the surface of the tissue and releasing the suction may be repeated multiple times. In some embodiments, multiple cycles of applying suction for 30 seconds followed by a 3-minute release may be effective in further dispersing the molecule through the cell membrane of tissue.

In some embodiments, the suction seal forms a circle covering the delivery site, for example a circle of approximately 6 mm in diameter and a seal thickness of approximately 1 to 1.5 mm. In other embodiments, the suction seal further includes a secondary seal within the first, wherein the secondary seal is raised and forms a weaker seal along the surface of the delivery site. In yet another embodiment, the suction seal forms an equilateral concave decagon covering the delivery site.

Another embodiment is a device to promote delivery of a molecule across a cell membrane. The device comprises a suction component configured to create a predetermined negative pressure and a disposable suction tip connected to the suction component and configured to form a seal along surface tissue to surround a molecule delivery site for applying the predetermined negative pressure. The device includes a controller configured to apply the predetermined negative pressure for a predetermined period of time and then release the negative pressure.

In some embodiments, the controller may be configured to control the suction component to apply a pressure of less than about 101 kPa to the surface of the tissue, such as between about 1 kPa and about 50 kPa, for example between about 1 kPa and about 10 kPa, such as between about 1 kPa and about 5 kPa. In some embodiments, the controller may control the suction component to create a predetermined negative pressure includes, for example a negative pressure between 40 kPa and 90 kPa.

In some embodiments, the disposable suction tip may have different geometries and dimensions. For example the disposable suction tip may be configured such that the seal forms a circle along the surface tissue, and in some embodiments the circle may have approximately a 6 mm diameter and a seal thickness of approximately 1 to 1.5 mm. In yet additional embodiments, the disposable suction tip may include a secondary seal surrounding the molecule delivery site, wherein the secondary seal is raised and forms a weaker seal along the surface tissue. In yet another embodiment, the disposable suction tip forms a seal in the shape of an equilateral concave decagon along the surface tissue. In some embodiments, the disposable suction tip may be interchangeably substituted with disposable suction tips having various shapes and sized seals selected based on a delivery protocol of the surface tissue or the molecule delivered. In yet additional embodiments, the device may include a disposable suction tip with an internal filter, the filter configured to prevent liquids from entering the suction component.

In additional embodiments, the device also includes an insertion component configured to deliver the molecule to a region of tissue surrounding the cell membrane. In further, related embodiments of the device, the insertion component may comprise a microneedle, or array of microneedles, including a coating that comprises the molecule. The coating may comprise a coating of a nucleic acid, such as a nucleic acid vaccine, for example a plasmid DNA vaccine or an mRNA vaccine, and may comprise a dried nucleic acid vaccine. The coating may also include a matrix material. The matrix material may comprise at least one of a polysaccharide, a protein, an enzyme, and a water soluble polymer. For example, the matrix material may comprise a polysaccharide such as trehalose or a water soluble polymer such as poly (vinyl pyrrolidone). The microneedle may comprise a length configured to deliver the molecule to an epidermal or dermal layer of skin, and may comprise a length of about 2 mm or less. The insertion component may comprise a syringe with one or several hollow needles, which may comprise a length configured to deliver the molecule to an epidermal or dermal layer of skin, and may comprise a length of about 2 mm or less.

The insertion component may comprise an elongated member configured to be advanced to be inserted into a surface of skin, and the suction component may comprise a surrounding elongated member configured to surround the surface of the skin into which the insertion component has been inserted, to apply suction. The insertion component may comprise a plunger. The suction component may comprise a suction cup.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 11 is an exploded view, FIG. 12 is an end view, and FIG. 13 is an upright view.

FIG. 14 is an exploded view and FIG. 15 is an assembled view.

FIGS. 25A-B show comparative results from an experiment using various geometries of suction tips.

FIGS. 26A-C are images of preliminary results of an experiment using various geometries of suction tips via ex-vivo imaging of GFP expression.

FIG. 29A presents a 3D view of the color-mapped strain (Frobenius norm) within the skin layer for an exemplary case of 65 kPa in applied pressure.

FIGS. 29B-F present cross-sectional views (in the r-z plane in the axisymmetric geometry of the strain magnitude about the focal region at 20, 45, 65, 80, and 90 kPa, respectively.

FIG. 29G illustrates volume quantification within the skin layer for Frobenius norm above the various thresholds from 0.2 to 0.7.

FIG. 29H presents the Forbenius norm from simulation using a human skin model at 65 kPa; the cross-section shows a thicker skin layer of 2 mm.

DETAILED DESCRIPTION

A description of example embodiments follows.

In an embodiment according to the invention, a method uses suction/vacuum to enhance the uptake and subsequent transfection and expression of plasmid DNAs, or other nucleic acids, in vivo. Experiments in accordance with an embodiment of the invention have demonstrated that the transfection is at a similar level to existing advanced technologies, such as electroporation, in a rat model.

In one example, DNA is introduced subcutaneously and then a suction device is immediately applied for 30 seconds.

In experiments in accordance with an embodiment of the invention, there has been demonstrated the expression of a green fluorescing protein in epidermal and dermal cells after 24 h from transcutaneous treatment with DNA plasmid via injection, injection plus electroporation, and injection plus suction. The technique using suction has been showed to have similar expression of DNA delivered from coated microneedle arrays as techniques such as electroporation.

Figure 1:
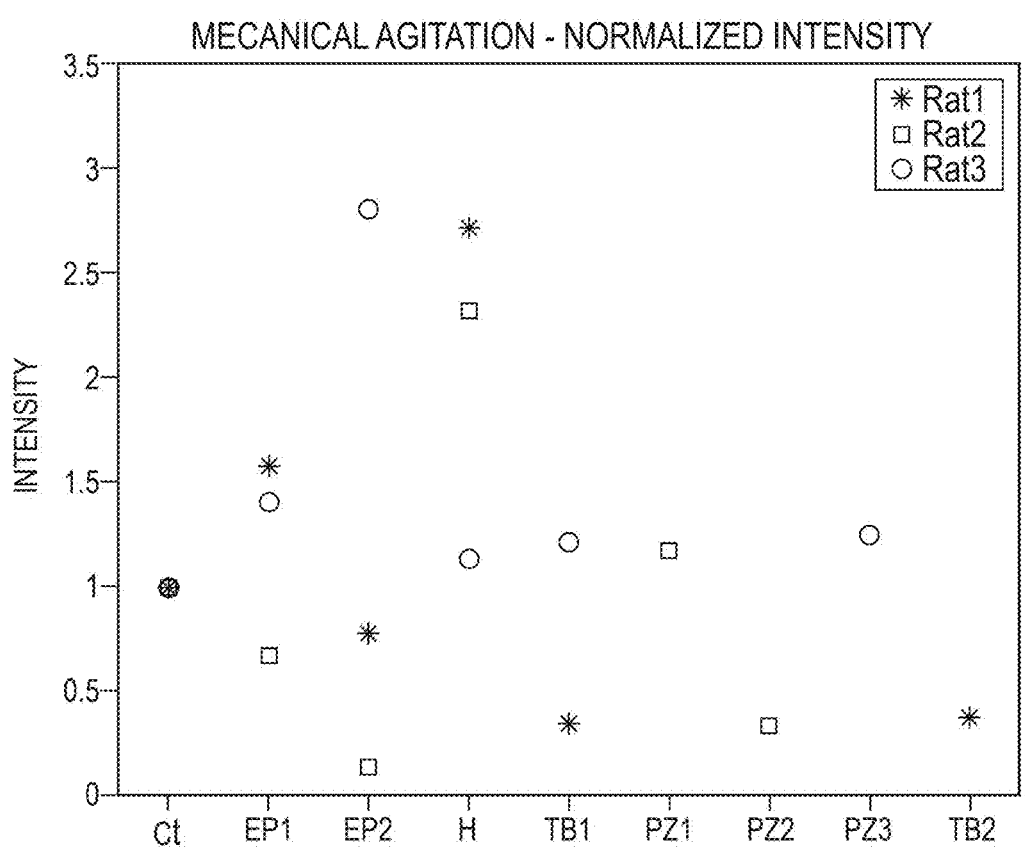
FIG. 1 is a graph of fluorescence intensity data normalized to control (Ct) comparing suction (H) to electroporation (EP1 and EP2) along with other mechanical treatments (PZ1-3, TB2), in an experiment in accordance with an embodiment of the invention.

FIG. 1 is a graph of fluorescence intensity data normalized to control (Ct) comparing suction (H) to electroporation (EP1 and EP2) along with other mechanical treatments (PZ1-3, TB2), in an experiment in accordance with an embodiment of the invention.

Figure 2:
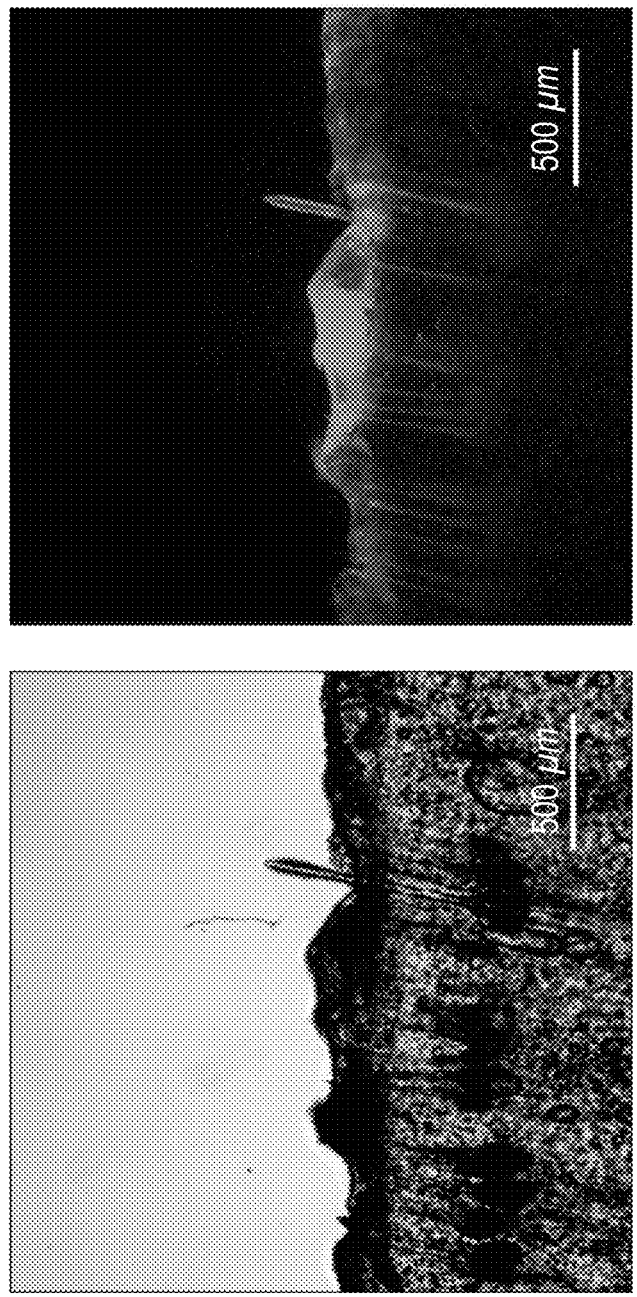
FIG. 2 shows microscope cross sectional images of rat skin after introduction of coated needles and application of suction, in an experiment in accordance with an embodiment of the invention.

FIG. 2 shows microscope cross sectional images of rat skin after introduction of needles coated with approximately 10 μg of GFP plasmid DNA and 5 μg trehalose with trace 1.6 μg of 75 nm gold nanoparticles as tracer, after dissolution for 1.5 minutes, removal of the needles, and application of 30 seconds of suction, in an experiment in accordance with an embodiment of the invention. The left image shows a bright field image of the section and the right image shows the same section imaged in green fluorescence showing the expression in the region of the needle insertion as a bright region. The scale bar in the right image represents 500 μm.

Embodiments can be used after vaccine injection to improve the transfection. Embodiments can also be incorporated into a device that includes a microneedle or microneedle array. One such device can both deliver the vaccine into the tissue and provide suction to promote permeabilization, transfection and subsequent expression. This can, for example, eliminate the need for vaccine injections and allow dry storage of the plasmid or mRNA vaccine at a lower dose, and significantly increase shelf life and ease of distribution.

An embodiment according to the invention efficiently mediates transdermal delivery and cellular uptake of nucleic acids for active vaccination. It can, for example, be used to deliver a COVID-19 vaccine, or other vaccines. DNA plasmids or other nucleic acids are delivered into the epidermis/ dermis, followed by application of a mechanical force via suction to enhance transfection.

Figure 3A:
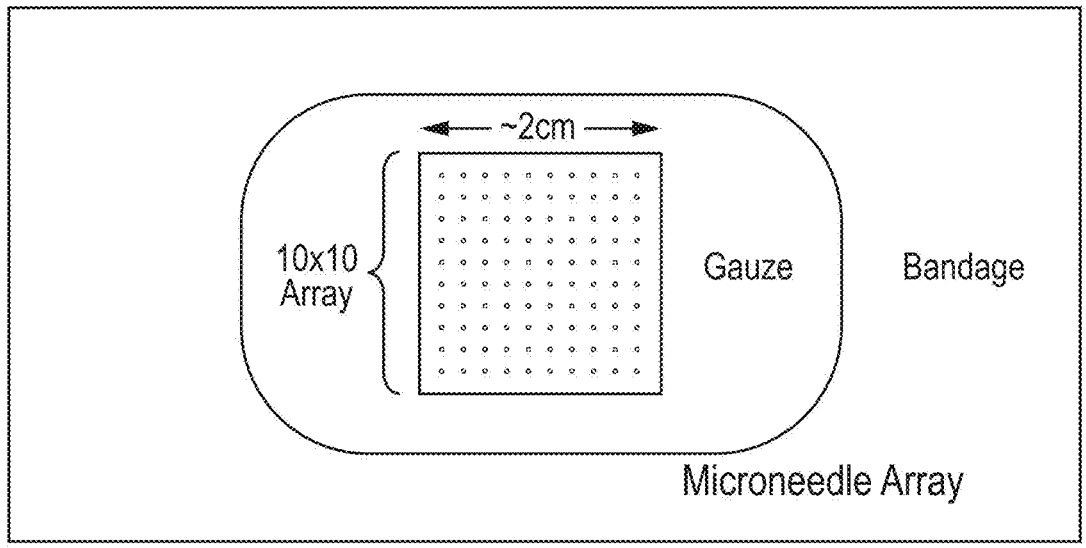
FIGS. 3A, 3B, 4A and 4B are schematic diagrams illustrating use of a microneedle patch and suction, in accordance with an embodiment of the invention.
Figure 3B:
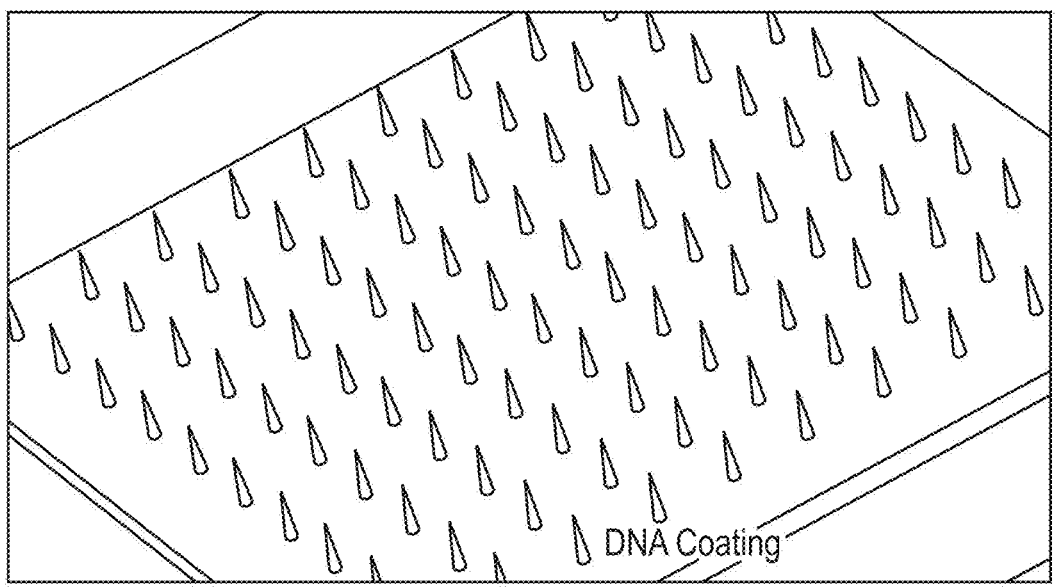
Figure 4A:
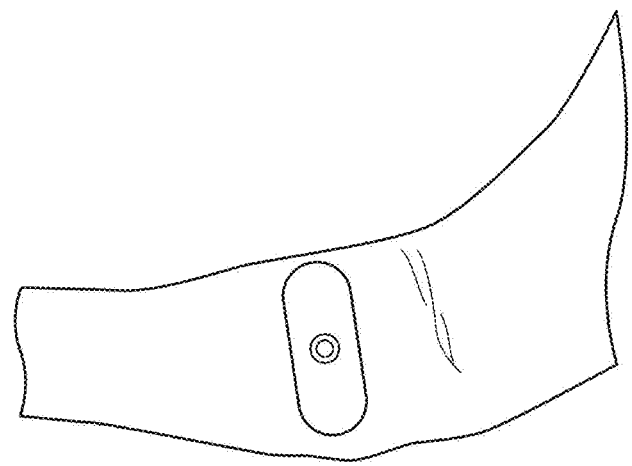
Figure 4B:
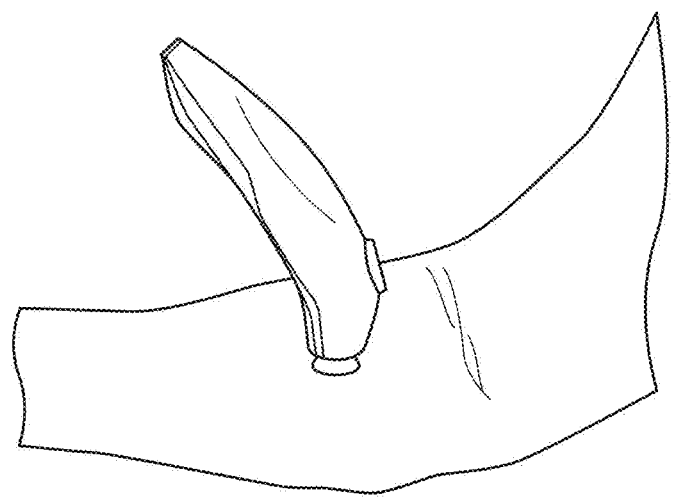

FIGS. 3A, 3B, 4A and 4B are schematic diagrams illustrating use of a microneedle patch and suction, in accordance with an embodiment of the invention. The example of FIG. 3A shows a 10×10 micro-needle/electrode array (green, 20 mm×20 mm) on a backing/patch (grey/brown). FIG. 3B shows that the micro-needle/electrodes can, for example, have protruding lengths of about 1-2 mm and can be coated with DNA using a self-limiting electrospray deposition technology, such as any of the techniques taught in Singer, J. P. and Lei, L., Thickness-limited electrospray deposition, International Patent Application PCT/US19/36776, 2019, published as International Patent Application Pub. No. WO/2019/241394, or in Lei, L., Kovacevich, D. A., Nitzsche, M. P., Ryu, J., Al-Marzoki, K., Rodriguez, G., Klein, L. C., Jitianu, A., and Singer, J. P. "Obtaining thickness-limited electrospray deposition for 3D coating." ACS Appl. Mater. Interfaces 2018, 11175-11188, the entire teachings of both of which references being incorporated by reference herein. FIG. 4A shows an example of a patch (125 mm×45 mm, mimicking an adhesive bandage) that can be applied to the forearm, or another location on a surface of skin, allowing DNA to dissolve. FIG. 4B illustrates that suction can be applied after patch removal, for example using the device shown. It will be appreciated that other techniques of applying pressure can be used. The patch can be one-use and disposed of. The suction device can be reusable after sterilization.

An embodiment can be used with transdermal vaccine delivery technologies to safely and efficiently achieve transfection in vivo with minimal dosage, to overcome the delivery bottleneck, so as to clear the roadblock for massive clinical DNA vaccination applications. An embodiment, such as that of FIGS. 3A, 3B, 4A and 4B, is based on a simple suction mechanism, which allows ease in operation, comparable or even higher transfection efficiency versus the current state-of-the-art by electroporation, and no worse trauma than subcutaneous injection. An appealing additional feature is that transfection can, for example, be realized with DNA dry-coated onto microneedle patches offering significant advantage in manufacturing, storage, transportation, and deployment. Experiments have demonstrated successful expression with a GFP reporting system.

In addition to DNA vaccines, the same method can be applied to other nucleic acid vaccines such as those based on mRNA and to deliver therapies for diseases such as cancer and HIV/AIDS.

Two features can, for example, be included in an embodiment according to the invention.

A first feature is the use of a mechanical, suction mechanism to disturb reversibly cells in the epidermis/dermis to facilitate transfection, such as DNA transfection. The efficacy has been demonstrated in preliminary experiments with GFP expression and benchmarked against the current state-of-the-art electroporation, as described further below. The suction mechanism can be implemented easily by low-cost devices, such as those shown in FIGS. 4B and 6-16. Using such a mechanism, laboratory results have demonstrated efficacy in inducing immunity in rats with delivery of a COVID-19 DNA vaccine.

A second feature is a molecule to be delivered, such as DNA (or another nucleic acid), coated onto a micro-needle array, for example via a self-limiting electrospray deposition (SLED) technique, such as any of those taught in Singer, J. P. and Lei, L., Thickness-limited electrospray deposition, International Patent Application PCT/US19/36776, 2019, published as International Patent Application Pub. No. WO/2019/241394, or in Lei, L., Kovacevich, D. A., Nitzsche, M. P., Ryu, J., Al-Marzoki, K., Rodriguez, G., Klein, L. C., Jitianu, A., and Singer, J. P. "Obtaining thickness-limited electrospray deposition for 3D coating." ACS Appl. Mater. Interfaces 2018, 10, 11175-11188, the entire teachings of both references being incorporated by reference herein. In addition to the molecule, such as DNA or another nucleic acid, the coating of the microneedle can, for example, include other substances, such as a matrix material. The matrix material can include any one or more of a polysaccharide, a protein, an enzyme, and a water soluble polymer, or any combinations of those. For example, the matrix material can include a polysaccharide such as trehalose or a water soluble polymer such as poly (vinyl pyrrolidone).

In embodiments, the needles (for example, about 1-2 mm length) induce minimal trauma and no bleeding, due to shallow penetration, which avoids nerve endings and blood vessels. The DNA is rapidly removed from the needles via dissolution of a carrier molecule to localize in the tissue subjected to suction-induced microtrauma.

Embodiments can, for example, provide the following advantages:
1) avoiding the need for costly and high-voltage electroporation devices such as anywhere from 40-200 Volts typical in prior devices;
2) enhancing greatly the tolerance in the absence of electric field application to human body and with only shallow transdermal penetration;
3) allowing rapid mass production, storage in dry form, and very long shelf life.

Examples

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the description herein and the following illustrative examples, make and utilize the present invention and practice the claimed methods. The following working examples therefore, specifically point out the preferred embodiments of the present invention, and are not to be construed as limiting in any way the remainder of the disclosure.

Preliminary Results

Figure 5C:
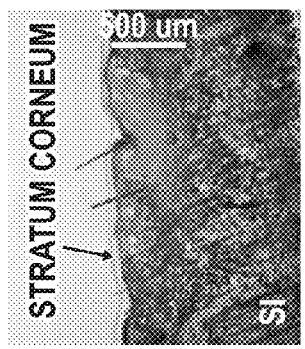
FIGS. 5A-5G are images of preliminary results of an experiment in accordance with an embodiment of the invention, showing preliminary results via ex-vivo imaging of GFP expression on rat skin.
Figure 5F:
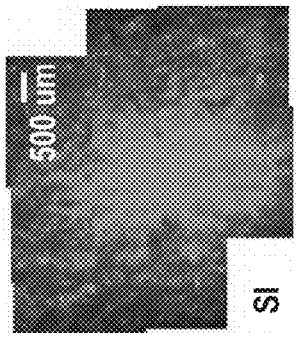
Figure 5B:
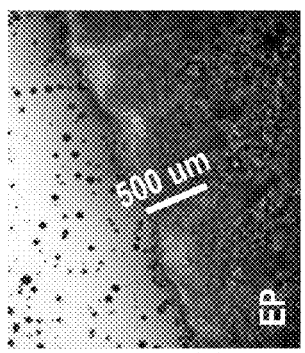
Figure 5E:
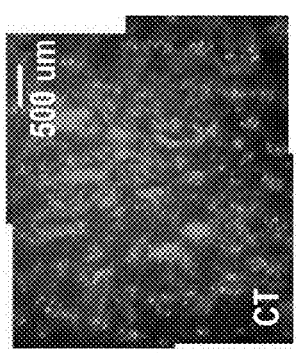
Figure 5A:
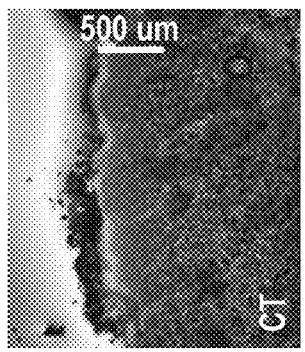
Figure 5D:
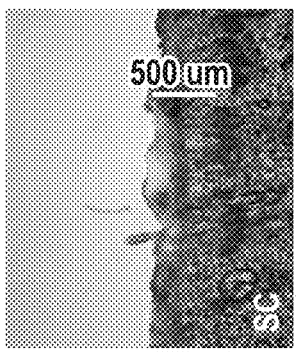
Figure 5G:
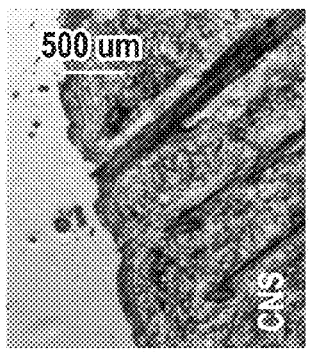

In a preliminary experiment in accordance with an embodiment of the invention, the results in four cases were compared (see FIGS. 5A-5G). FIGS. 5A-5D show images of preliminary results of the experiment. In FIG. 5A, there is shown the results for Control ("CT"), where solutions of pEGFP-N1 were injected subcutaneously with a 1 cc, 28 G insulin syringe. In FIG. 5B, there is shown the results for Electroporation ("EP"), where the same solution was injected, followed by electroporation with a micro-needle array. In FIG. 5C, there is shown the results for Suction with injection ("SI"), the same as FIG. 5A but a negative pressure of −65 kPa was applied for 30 seconds (only) at the site. In FIG. 5D, there is shown Suction ("SC") with coated microneedles, where the same micro-needle array was coated with DNA, inserted into the skin for 90 seconds, and then withdrawn. Application of suction same as in FIG. 5C ensues. In FIG. 5B, the protocol for electroporation follows closely the parameters as published for an electroporation device in clinical development. Further, the control cases for FIG. 5D, namely, coated microneedle insertion only without suction ("CNS") as shown in FIG. 5G, had no detectable expression, which is the unsurprising reason that coated microneedles are not widely used for DNA transfection.

FIGS. 5A-5D and 5G are views via cryotome sectioning, and the scale bars initiate approximately below the stratum corneum. Each image is a superposition of those collected from bright-field imaging and red, green channels, although only signal from the green channel is correlated with GFP expression. FIGS. 5E and 5F are top view of FIGS. 5A and 5C respectively.

FIGS. 5A-5D show exemplary sectioned results for GFP fluorescence at 24 hours post transfection. It is observed that control (injection of plasmid solution only) showed expression mostly within the first 50 µm of skin (in the epidermis, which has a thickness of approximately 100-150 µm). In contrast, EP and SC results are comparable, covering most of the epidermal layer (100-200 µm deep), whereas SI reached down to the dermis with a depth of approximately 400 µm. Expression coverage from a top-view perspective were also examined in FIGS. 5E and 5F: area of bright intensities in the non-CT cases (SI is shown), FIG. 5F, was typically 3-4 times greater than CT (FIG. 5E) by a quick estimation of counting pixels above a set threshold. These results corroborate with literature that additional mechanisms (such as electroporation, versus injection alone) are indispensable for effective transfection and enhances efficiency by an order of magnitude (2-5). Past work demonstrated a good correlation between the GFP expression and actual immunogenicity within the same rat model, and it is expected that the preliminary results above using suction as the novel transfection mechanism will translate to similar results in vaccine study when benchmarked against control or electroporation.

In additional experiments in accordance with embodiments of the invention and as shown in FIG. 17, FIGS. 18A-D and FIGS. 19A and B, a number of observations were reached concerning treatment protocols. Following a Mantoux injection to shaved Sprague-Dawley rat dorsal skin, a negative pressure was applied to the injection bleb. In the experiments, the shallow injection targeted the epidermal and upper dermal layers. A plastic, disposable, nozzle-shaped suction cup was used to surround the surface of the delivery site with a suction seal. The cup had an inner diameter of 6 mm and a rim thickness of 1 mm, and completely encompassed the bleb from a 50 µL ID injection. Suction was applied to the surface of the delivery site. The treated skin area was slightly greater than the cup opening, due to stretching induced by both suction and bleb distention.

Figure 17:
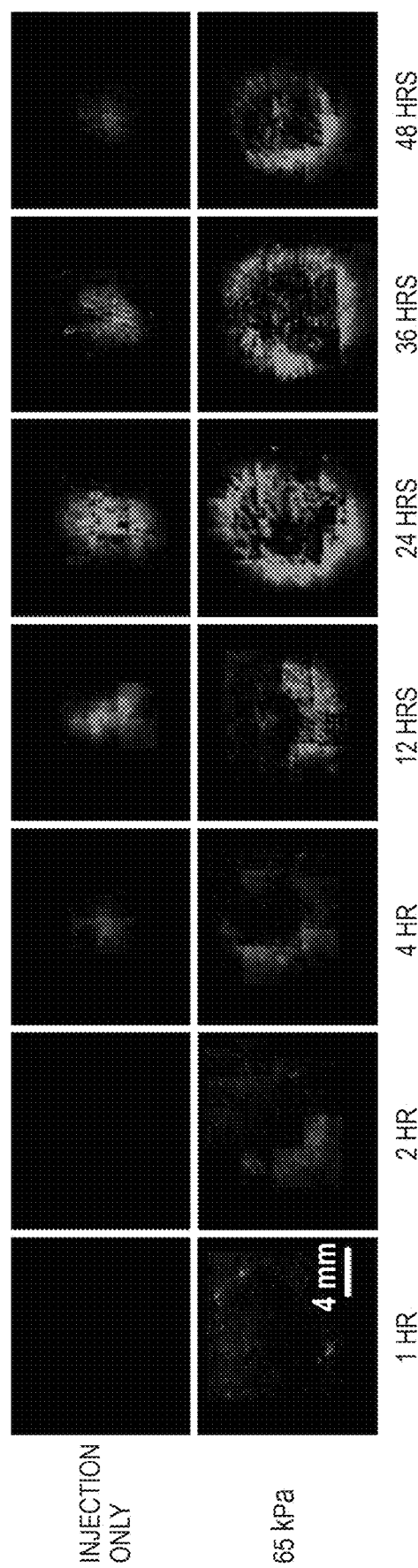
FIG. 17 are images of preliminary results of an experiment in accordance with an embodiment of the invention, showing preliminary results via ex-vivo imaging of GFP expression on rat skin.

Time course of GFP expression. Suction was applied at 65 kPa for 30 seconds immediately after injection of 25 µg pEGFP-N1 plasmid in 50 µL (1×PBS) solution, with internal replicates performed on the same rat at different dorsal sites. Fluorescence microscopy of explanted skin was performed to examine GFP expression, with auto- and background fluorescence corrected at the software level by correlating signals from the FITC/TRITC channels. As shown in FIG. 17, injection without secondary applied suction ("injection only", serving as control) showed detectable expression at 4 hours and stronger signal at 24 hours. In contrast, when injection was followed by suction, punctate GFP expression at the rim was detectable as early as 1 hour. By 24 hours, expression encompassed most of the cup rim and extended centripetally to the region of displacement. The signal continued to increase with time, and the strongest intensity was observed between 24 and 48 hours. Further examination of cryosectioned skin at 24 hours showed GFP expression to a depth approximately 400 µm from the surface of the epidermis in suction cases, whereas injection alone yielded expression confined primarily to a region extending 50 µm from the skin surface.

Figure 18B:
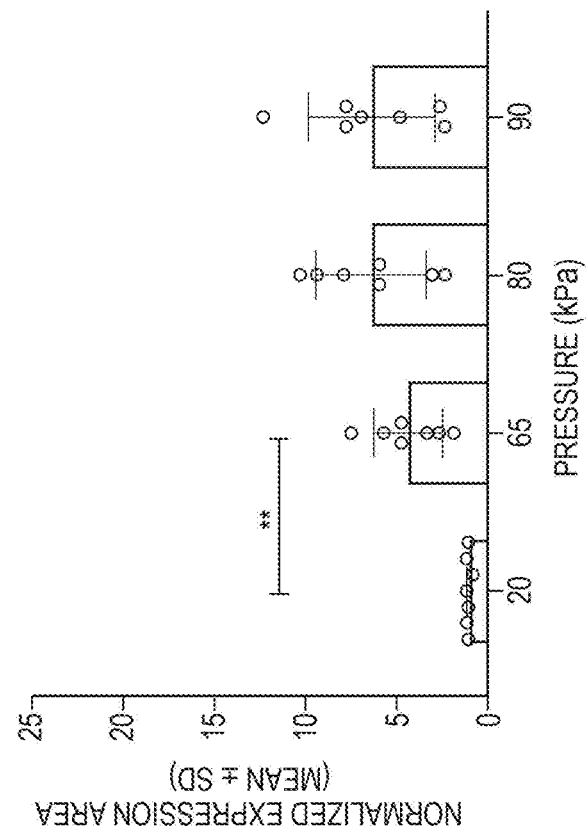
FIGS. 18A and 18B are charts presenting the effects of suction pressure for suction-assisted DNA entry.
Figure 18A:
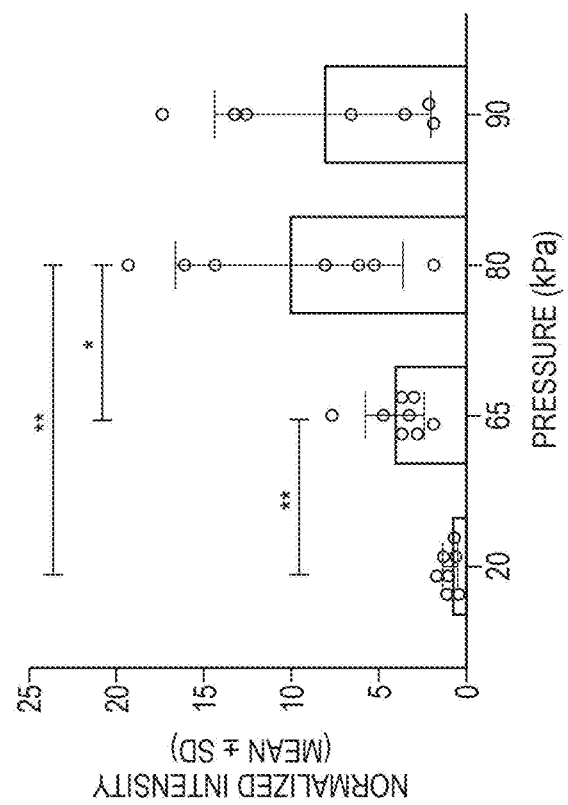

Expression depends on pressure. FIGS. 18A and B present the effects of suction pressure for suction-assisted DNA entry. The same pEGFP-N1 plasmid solution (25 µg in 50 µL) was injected, followed by negative pressure application of 20 kPa, 65 kPa, 80 kPa, and 90 kPa for 30 seconds. The fold-enhancement in expression at 24 hours is quantified by calculating the total fluorescence intensity or the total number of pixels displaying expression signal above background for each injection site, and then normalizing by the respective values from the control location (injection only) within the same animal. At 20 kPa, a mean of 0.97 suggests essentially no difference relative to control. As pressure increases to 65 and 80 kPa, both mean and scatter increases. At the highest applied pressure of 90 kPa, expression appears to decrease, but the difference with 80 kPa was not statistically significant. Similar trends are shown in FIG. 18B, which is interpreted as effective expression area.

Figure 18D:
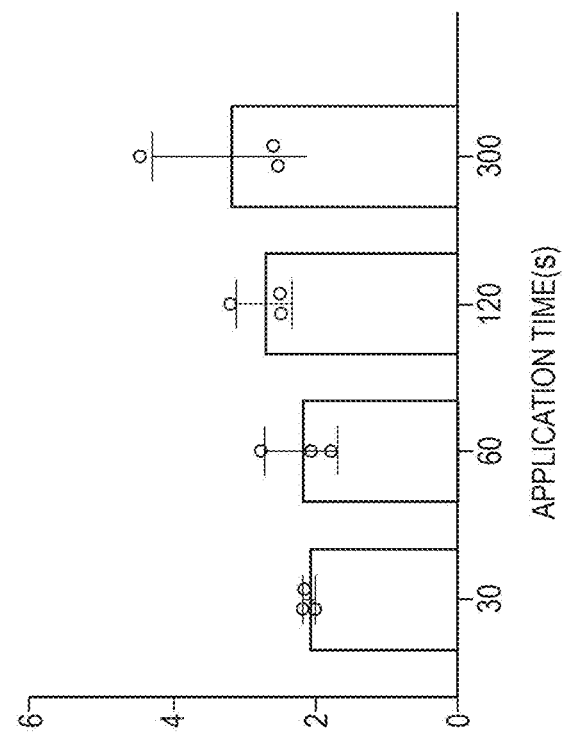
FIGS. 18C and 18D are charts presenting normalized intensity and expression area, respectively, in relation to suction application time at various application times.
Figure 18C:
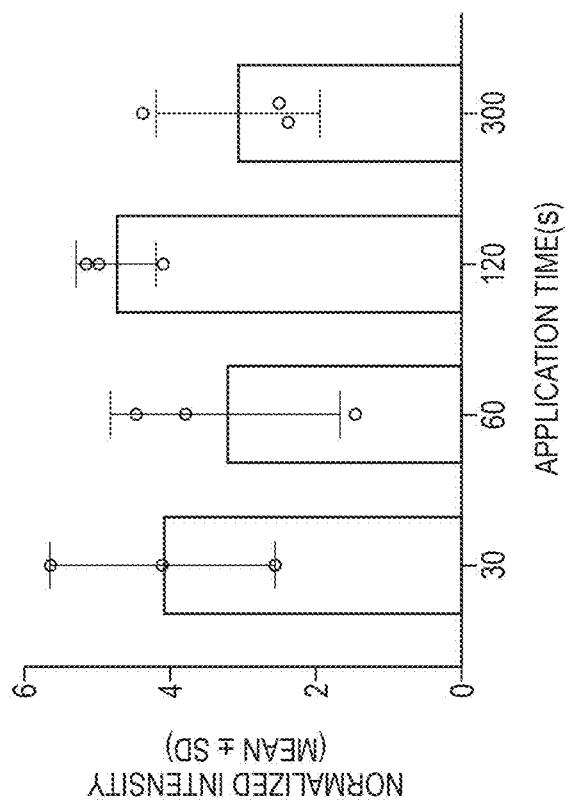

FIGS. 18C and 18D display normalized intensity and expression area, respectively, in relation to suction application time ranging from 30 to 300 seconds, all at 65 kPa. No statistically significant correlation with application time was detected. Additionally, quantitatively consistent expression via different negative-pressure delivery platforms was observed provided the same pressure, suction time, and cup geometry were applied.

Tension-relaxation is a possible trigger for endocytosis. The combined simulation and pressure studies indicate that a local threshold deformation is required for transfection activation. In addition, the lack of sensitivity to suction application time suggests that activation does not require prolonged deformation. Based on the simulation results, the strain in the focal ring is mostly between 0.25 and 0.75. If an idealized spherical cell is embedded in this continuum and such strain leads to an incompressible ellipsoidal deformation, this magnitude of strain translates to an area dilation in the range of 1-10%. These findings correlate with a recent discovery by Thottacherry et al., where the dynamin-independent CILC/GEEC (CG) endocytotic pathway was found to be rapidly upregulated in vitro when cells relax after being mechanically elongated by a linear strain of 6% for 90 seconds. The process activates endocytotic reservoir formation as a means to recycle excess membrane area and restore membrane tension homeostasis. Thus, the dermal suction provides the necessary area dilation so as to trigger the CG pathway in vivo. In fact, the magnitude of area dilation matches well with that in which is also several percent due to the slender cell shape therein. The enhanced cellular DNA uptake with suction follows a mechanism different than electroporation which is clathrin, caveolae, or Rac1-dependent. Importantly, similar strain magnitudes can be generated in the simulation of human skin (i.e., with different thicknesses and absence of the panniculus carnosus muscle, suggesting that these results will be translatable from the rodent model.

Figure 30:
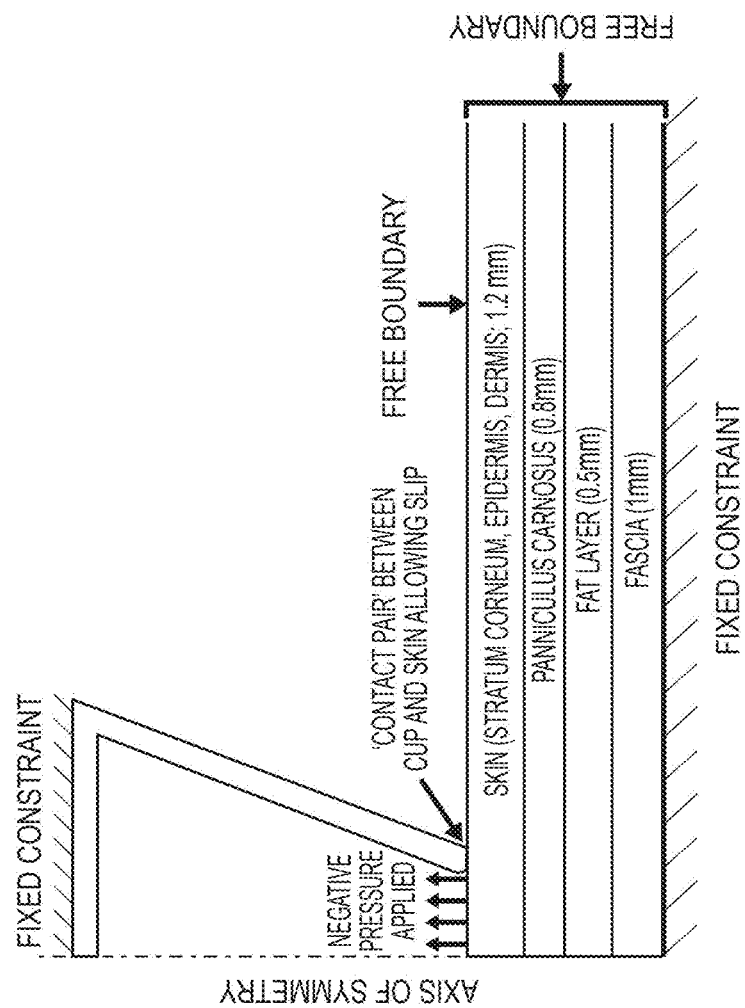
FIG. 30 illustrates a multi-layer model employed in a simulation with geometry for skin.
Figure 31A:
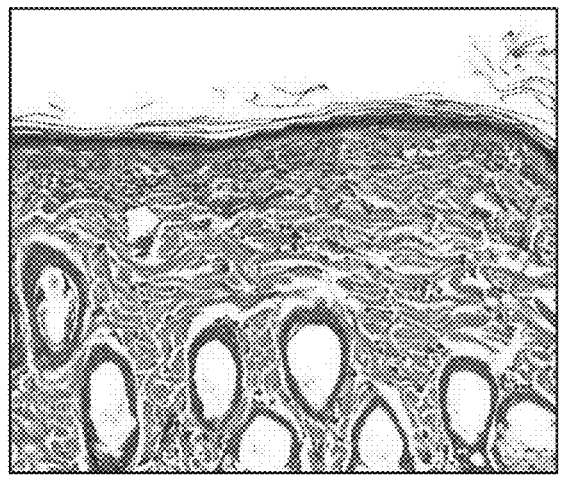
FIGS. 31A and 31B show hematoxylin and eosin (H&E) staining preformed from skin harvested 24 hours post injection of GFP plasmids with and without suction.
Figure 31B:
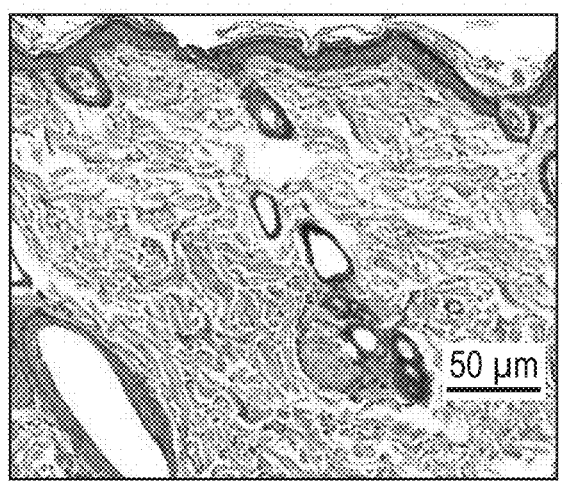

Transgene Expression Pattern is Strongly Correlated with Simulated Stress/Strain Distribution A numerical simulation is performed to study the stress/strain distribution induced by suction. A multi-layer model is employed with geometry for the skin, fat, panniculus carnosus, and fascia layers based on dissected skin samples of the animals used in the current work, as illustrated by FIG. 30. The simulation is performed in COMSOL Multiphysics with each layer added as a homogeneous, hyperelastic monolith that is axisymmetric around the cup axis (z-axis in FIG. 29A and FIG. 30). Boundary conditions are implemented to emulate the slip-contact between the cup rim and the skin under suction which is observed in the model to expand the application site by 0.2 mm radially to 6.4 mm in diameter. A Neo-Hookean strain energy was used to model the skin, fat, and fascia layers. Among the many hyperelastic models, this model is the simplest requiring only the Young's Modulus and Poisson's ratio of the material. Importantly, properties for skin are chosen from experimental measurements resulting from a suction chamber that best match the current situation. Properties for the fascia follows Iatridis et al. which best represent those of the loose connective tissue. For the panniculus carnosus muscle and in the absence of direct measurement results, an Ogden energy function was selected following Bosboom et al. which demonstrated good agreement between model and experimental data for rat skeletal muscle under in vivo compression.

FIG. 29A presents a 3D view of the color-mapped strain (Frobenius norm) within the skin layer for the exemplary case of 65 kPa in applied pressure; other layers are omitted for clarity. FIG. 29B-F illustrate cross-sectional views (in the r-z plane in the axisymmetric geometry, see arrow in panel a) of the strain magnitude about the focal region at 20, 45, 65, 80, and 90 kPa, respectively. FIG. 29G illustrates volume quantification within the skin layer for Frobenius norm above the various thresholds from 0.2 to 0.7. FIG. 29H presents the Forbenius norm from simulation using a human skin model at 65 kPa; the cross-section shows a thicker skin layer of 2 mm. The strain distribution is quantitatively similar to that within a rat skin despite the anatomical differences. A ring of strain concentration similar to the early-time expression pattern created by suction is evident. The same focal patterns are observed for stress and strain energy (SI), and these focal effects appear to arise from the cup rim reacting with a downward force to balance skin lifting due to suction. The depth of this focal ring can be seen to penetrate the entire skin layer (1.2 mm). To further investigate the dependence of deformation on suction pressure magnitude, cross-sectional views of the r-z plane in the axisymmetric geometry (see red arrow in FIG. 29A) of the strain magnitude about the focal location are shown in FIGS. 29B-F, where the same color map is used to facilitate comparison. At the lower pressures of 20 and 45 kPa the strain is mostly under 0.5, with a majority or all of the cross-sectional area under 0.25. At 65 kPa the area above 0.25 is significantly expanded, and the highest strain reaches up to 1. At 80 and 90 kPa the trend of strain increase continues, and the area with significant strain (>0.5) penetrates the entire skin layer. FIG. 29G quantifies the volume within the skin, noting that the simulation is in an axisymmetric geometry, above a threshold strain value.

Strain-Relaxation is a Possible Trigger for Endocytosis

The experimental study suggests that a local threshold pressure is required for transfection activation. In addition, the lack of sensitivity to suction application time suggests that activation does not require prolonged pressure application. Based on these results with the simulation and recent work by Thottacherry et al., it appears that (1) the molecular uptake is induced by applied deformation, and 2) a relaxation-based endocytotic mechanism is responsible for the uptake. The first conclusion is supported by the observations above. For the second, Thottacherry et al. found that a dynamin-independent CLIC/GEEC (CG) endocytotic pathway was rapidly upregulated in vitro when cells relaxed after being mechanically elongated by a linear strain of 6% for 90 seconds. The process activates endocytotic reservoir formation as means to recycle excess membrane area and restore membrane tension homeostasis. This finding supports that suction provides the necessary deformation so as to trigger the CG pathway in vivo. Based on comparison of the simulation (e.g., FIG. 29G) with the experiment (e.g., FIG. 18A), a Frobenius norm of 0.3 to 0.5 is estimated to be required to generate significant transfection. If an idealized spherical cell is embedded in this continuum and such strain leads to an incompressible ellipsoidal deformation, this magnitude of strain translates to an area dilation in the range of 2-5% (details on this estimation is included in the SI). In fact, this magnitude of area dilation matches well with that in J. J. Thottacherry, A. J. Kosmalska, A. Kumar, A. S. Vishen, A. Elosegui-Artola, S. Pradhan, S. Sharma, P. P. Singh, M. C. Guadamillas, N. Chaudhary, R. Vishwakarma, X. Trepat, M. A. Del Pozo, R. G. Parton, M. Rao, P. Pullarkat, P. Roca-Cusachs, S. Mayor, "Mechanochemical feedback control of dynamin independent endocytosis modulates membrane tension in adherent cells." Nat. Commun. 9, 4217 (2018). et al., which is estimated to be in the same range (e.g., >2% for an elongated cell of aspect ratio 3 under a linear strain of 6%). The enhanced cellular DNA uptake with suction follows a mechanism different than EP which is clathrin, caveolae, or Rac1-dependent. Importantly, similar strain magnitudes can be generated in a simulation of human skin (with different thicknesses and absence of the panniculus carnosus muscle, FIG. 29H). This similarity not only suggests that the results will be translatable from the rodent model, but also demonstrates the robustness of the model prediction in two significantly different anatomical configurations.

Figures 19A, 19B:
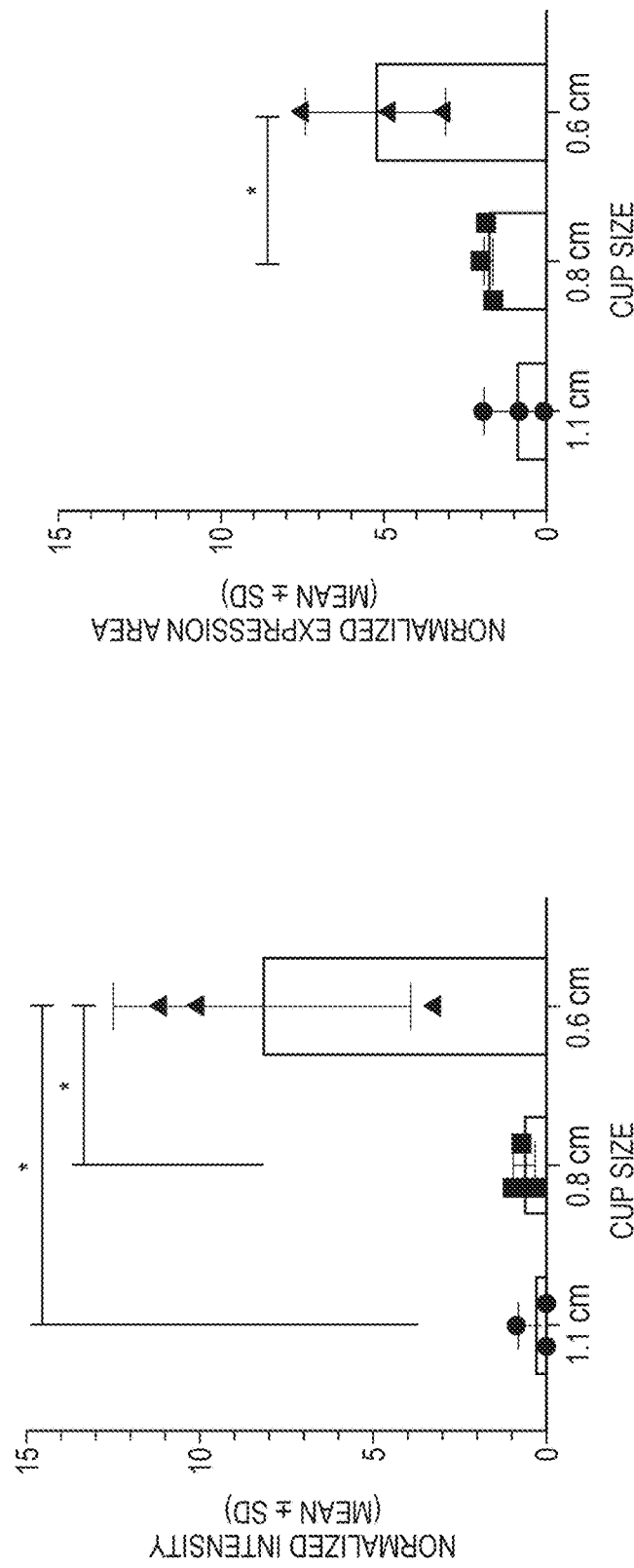
FIGS. 19A and 19B illustrate the results for experiments using suction with injection at various cup sizes in accordance with principles of the invention.

Cup Size and Geometry May Impact Expression. In additional experiments, the impact of the size and geometry of the suction tip forming a seal at the delivery site was explored. In FIGS. 19A and 19B, there is shown the results for SI-Suction with injection using a cup sizes of 1.1 cm, 0.8 cm and 0.6 cm. FIGS. 19A and 19B display normalized intensity and expression area, respectively, in relation to suction application after a period of 24 hours.

Figure 20B:
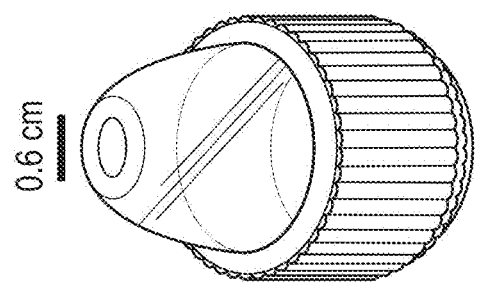
FIG. 20B is an exemplary suction tip used in connection with principles of the invention.
Figure 20A:
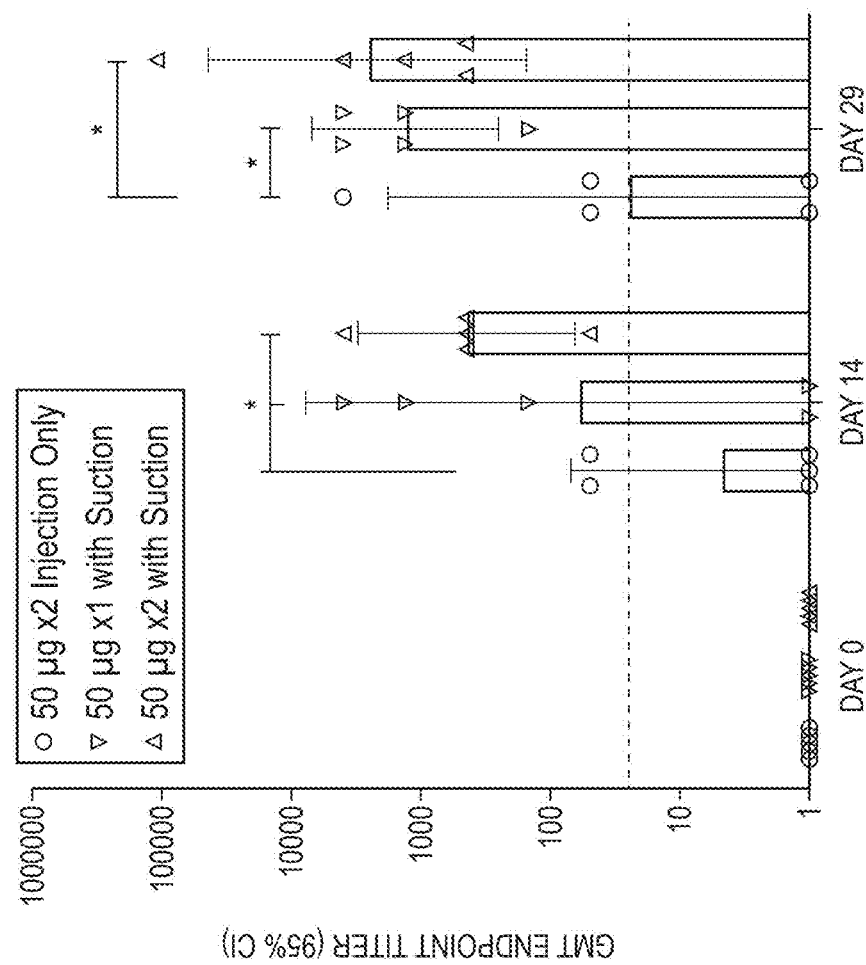
FIG. 20A is a chart demonstrating the results of induction of host immune response by suction-mediated DNA vaccine delivery.
Figure 21:
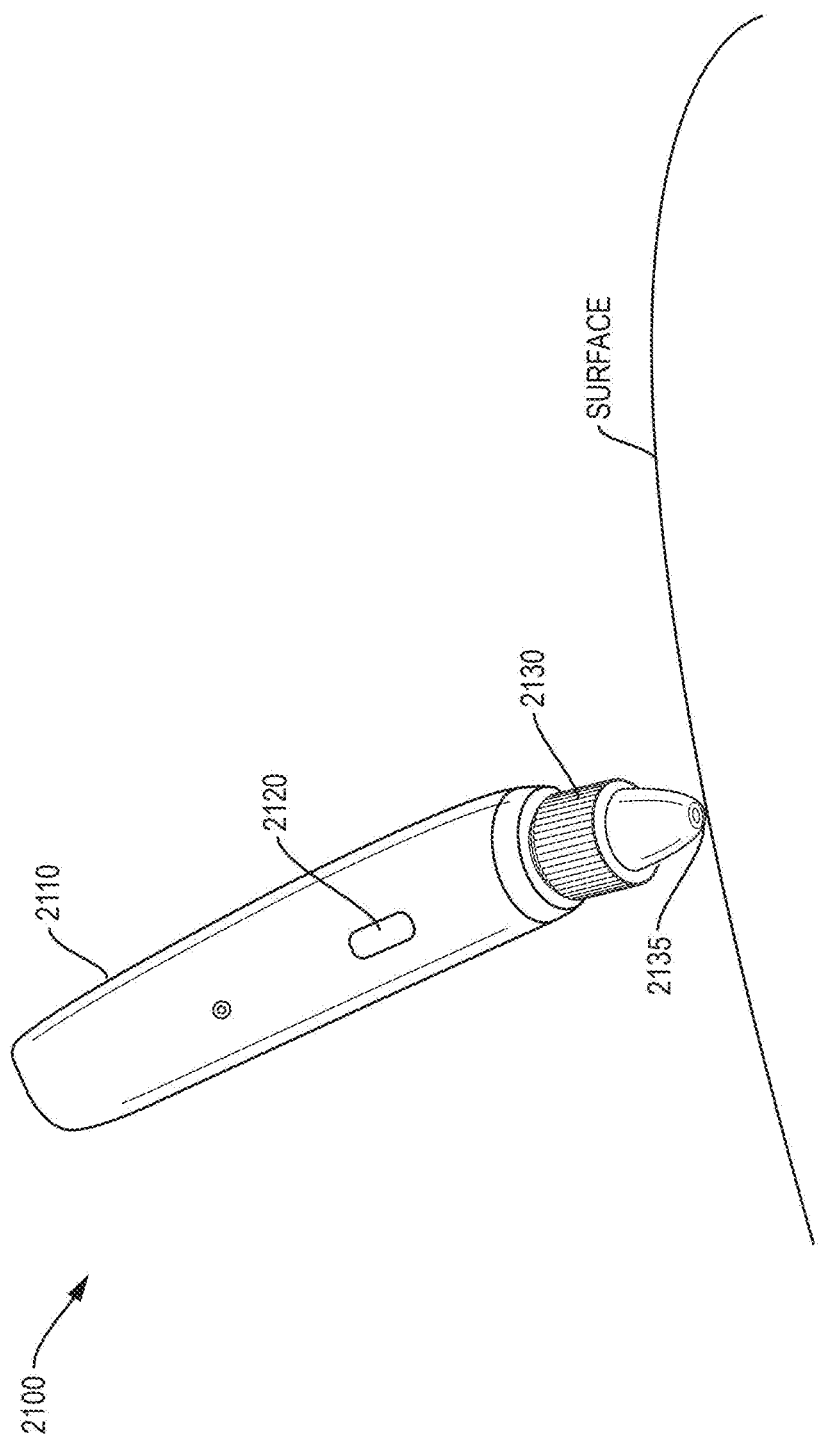
FIG. 21 is a device to promote delivery of a molecule across a cell membrane according to an embodiment consistent with principles of the invention.

Host immune responses are induced in a suction-mediated DNA vaccine delivery. FIG. 20A demonstrates induction of host immune response by suction-mediated DNA vaccine delivery. A candidate DNA vaccine encoding the SARS-CoV-2 spike synthetic DNA was delivered by ID Mantoux injection and followed by suction. A device as described by FIG. 21 was used to apply a negative pressure of 65 kPa for 30 s through a tip described by FIG. 20B. Groups of rats (n=5) were immunized with 50 μg DNA vaccine in 50 μL of PBS solution. One group received two injections of the vaccine candidate without suction on days 0 and 14 ("50 μg×2 injection only"); a second group received a single vaccination, followed by dermal suction on day 0 ("50 μg+suction×1"); and a third group received two vaccinations on days 0 and 14 with both injections followed by dermal suction ("50 μg+suction×2"). Humoral immune responses to the SARS-CoV-2 S1 spike protein were determined from serum collected pre-vaccination on day 0 and on day 14 (two weeks post first immunization), and then at the time of terminal bleed on day 29 (two weeks post second immunization). Geometric mean end-point titers (GMT) of IgG against the S1 protein as determined by enzyme-linked immunosorbent assay ("ELISA") are presented in FIG. 20A. As shown, ELISA titers for humoral responses using the suction device yielded binding antibodies with GMT between $2\times10^3$ to $5\times10^3$, significantly greater than injection alone. Injection followed by suction induced seroconversion in 80% of rats by 2 weeks and 100% by 4 weeks. Notably, immune responses in rats who received a single injection followed by suction were not statistically different from those who received two injections, suggesting that this method of DNA vaccine delivery may provide clear benefits.

Histology Indicates No Structural Damage

FIGS. 31A and 31B show hematoxylin and eosin (H&E) staining preformed from skin harvested 24 hours post injection of GFP plasmids without suction (FIG. 31A) and followed by suction treatment at 65 kPa for 30 seconds (FIG. 31B). No evidence of tissue damage or lymphocyte infiltration was presented in sections within injection/suction-treated region, and no remarkable difference was observed when compared against skin that received DNA injection only. Such damage is not only commonly observed for EP, but has been posited as necessary to ensure an immune response. In contrast, suction is able to achieve the same goal in the absence of histologic evidence of damage.

FIG. 21 is a schematic diagram of a device 2100 to promote delivery of a molecule across a cell membrane, in accordance with an embodiment of the invention. The device 2100 includes a suction component 2110 configured to create a predetermined negative pressure. The device also includes a disposable suction tip 2130 connected to the suction component. The suction tip 2130 includes an opening 2135 configured to form a seal along surface tissue to surround a molecule delivery site for applying the predetermined negative pressure. A controller (not shown) within the device 2100 is configured to apply the predetermined negative pressure for a predetermined period of time and then release the negative pressure. In some embodiments, the disposable suction tip 2103 includes an internal filter (not shown). The filter may be designed to prevent liquids from entering the suction component which may contaminate the device and interfere with its operation.

In some embodiments, the suction component may be configured to apply a predetermined negative pressure for example between 40 kPa and 90 kPa. In some embodiments, the suction may be configured to apply the negative pressure for a predetermined period of time between 1 and 40 seconds, for example approximately 30 seconds.

Figure 24A:
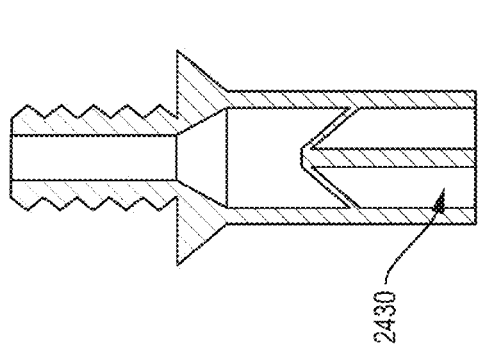
FIGS. 24A and 24B illustrate two perspective views of an exemplary suction tip used in connection with principles of the invention.
Figure 24B:
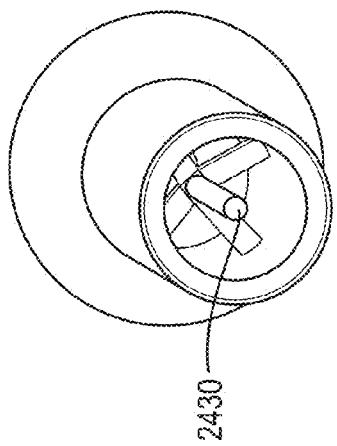
Figure 24C:
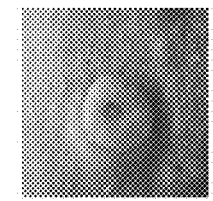
FIG. 24C illustrates a resulting bleb from the suction tip at the delivery site.
Figure 23A:
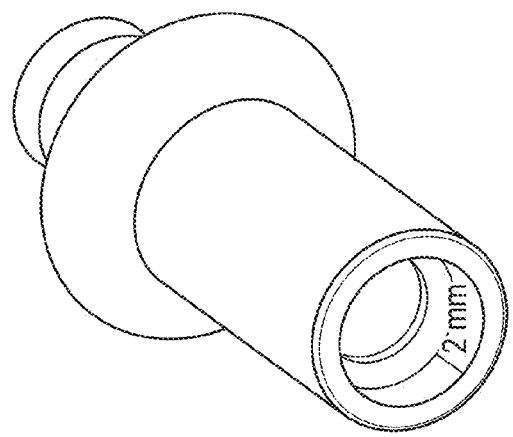
FIG. 23A illustrates an exemplary suction tip used in connection with principles of the invention.
Figure 23B:
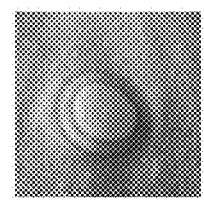
FIG. 23B illustrates a resulting bleb from the suction tip at the delivery site.
Figure 22A:
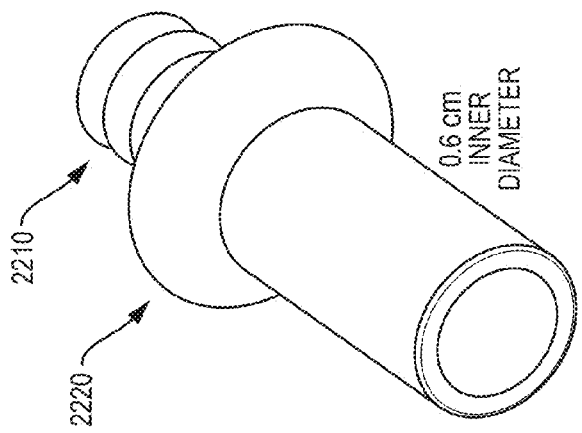
FIG. 22A illustrates an exemplary suction tip used in connection with principles of the invention.
Figure 22B:
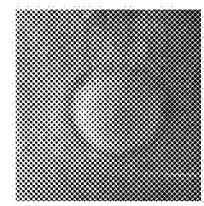
FIG. 22B illustrates a resulting bleb from the suction tip at the delivery site.

FIGS. 22A-B, 23A-B, and 24A-C illustrate different suction tips that may be used in connection with yet embodiments. As shown in FIG. 22A, the disposable suction tip may be configured such that the seal forms a circle along the surface tissue, for example it may for a circle of approximately 6 mm with a seal thickness of approximately 1 to 1.5 mm. As shown in FIG. 22B, when applied to the surface skin, the circular suction seal forms around the delivery site. The disposable suction tip in FIG. 22A includes a tube fitted barb 2210 for insertion into the suction component, as well as a stopper 2220, both providing stability as well as a seal for the applied suction through the suction tip. In yet other embodiments as shown in FIG. 23A, the disposable suction time may be configured such that within the suction tip a secondary seal is formed by having raised point of contact that forms a weaker seal along the surface tissue. For example, the secondary seal may be situated 2 mm from the first seal within the suction tip. As show in FIG. 23B, this results in two seals applied to the surface skin. FIGS. 24A and 24B illustrate yet another embodiment wherein a pillar 2430 is created within the suction tip such that the pillar applies pressure proximate to the delivery site as the seal is applied. FIG. 24C shows a delivery site wherein the pillar has placed pressure within the circumference of the suction seal. In embodiment of the invention, each disposable suction tip may be interchangeably substituted with another disposable suction tips having various shapes and sized seals selected based on a delivery protocol of the surface tissue or the molecule delivered.

FIGS. 25A-B show comparative results from an experiment using the suction tips described with respect to FIGS. 23A-B, FIGS. 24A-B, and FIGS. 25A-C. The suction tips were 6 mm in diameter, and a suction pressure of 65 kPa was applied for 30 seconds. Normalized intensity of the open ring seal of FIG. 23A and the double ring seal of FIG. 24A suggested a higher intensity than the pillar of FIG. 25A. However, the open ring seal had a larger standard deviation than both the double ring seal and the pillar. Similarly, when examining the normalized expression area, both the open ring and double ring demonstrated a slightly larger expression area, however the standard deviation of the open ring was again greater than the other suction tips.

In comparing the various suction tips of FIG. 23A, FIG. 24A, and FIG. 25A, fluorescence microscopy results shown in FIGS. 26A, 26B, and 26C respectively, of explanted skin performed to examine GFP expression of each suction tip, with auto- and background fluorescence corrected at the software level by correlating signals from the FITC/TRITC channels. As shown in FIG. 26A, injection with an open-ring demonstrated detectable expression at 24 hours. FIG. 26 B demonstrated similar results, though the pillar ring seal of FIG. 25A presented a lower GFP expression.

Figure 27:
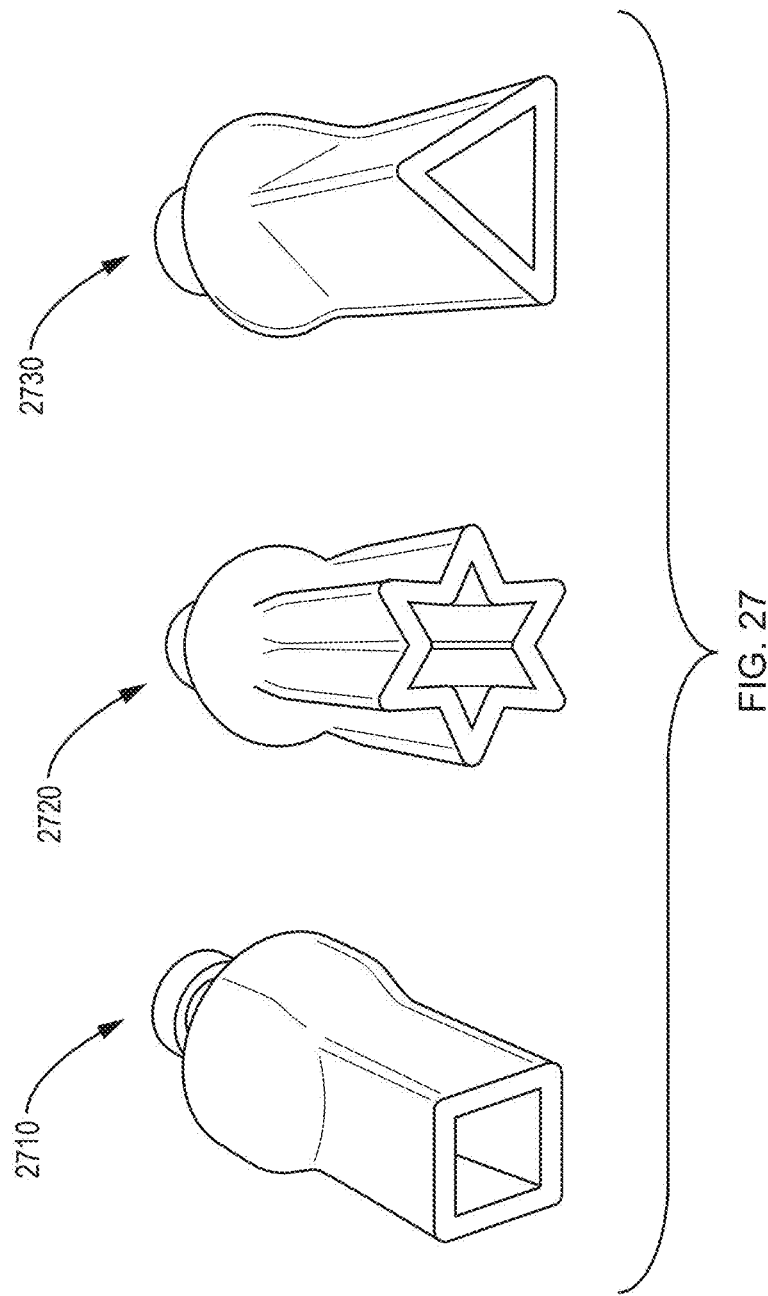
FIG. 27 illustrates different geometries of suction tips used in connection with embodiments consistent with principle of the invention.
Figure 28B:
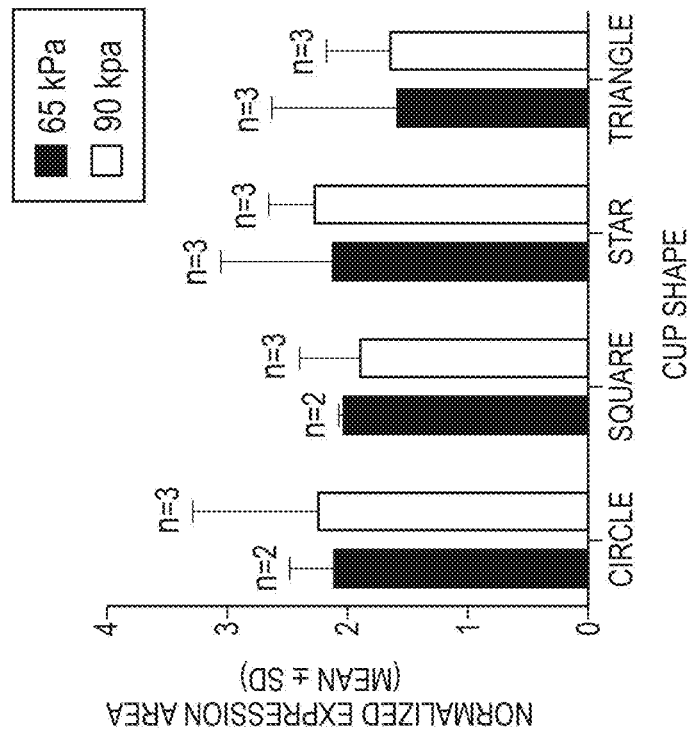
FIGS. 28A and 28B are charts demonstrating the normalized intensity and expression area of various geometries of suction tips used in connection with embodiments consistent with principle of the invention.
Figure 28A:
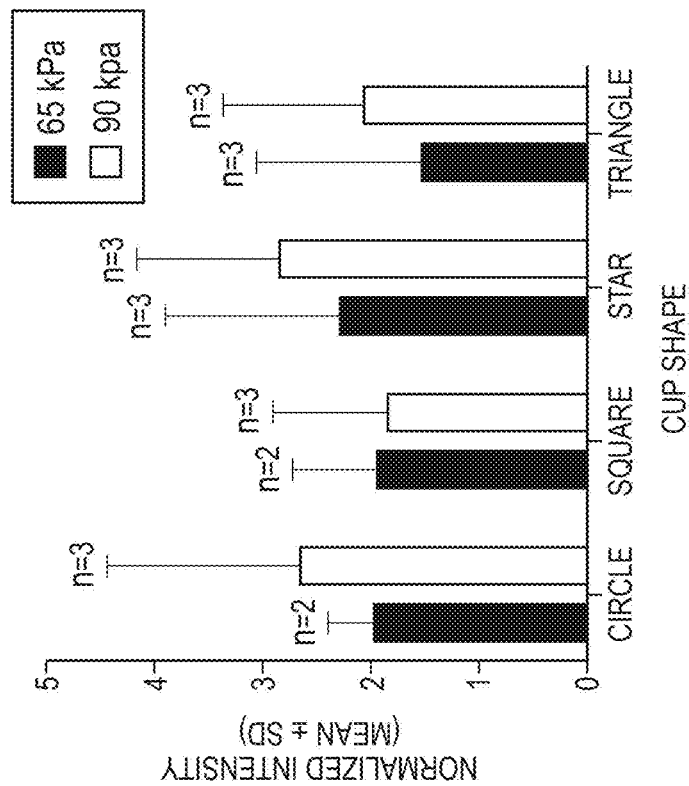

FIG. 27 illustrates different geometries of suction tips used in connection with embodiments consistent with principled of invention. Suction tips having a square opening 2710, an equilateral concave decagon (i.e., a star) 2720 and equilateral triangle 2730 were created using a 3-D printer. FIG. 28A and FIG. 28B are charts demonstrating the normalized intensity and expression area, respectively, for each of the circular suction tip of FIG. 22A, and the square, star, and triangle shown in FIG. 27 using negative pressure of 65 kPa and 90 kPa. While all shapes provided significant increase in intensity and expression area, both the circular and equilateral concave decagon at 90 kPa resulted in higher levels of normalized intensity and expression area. A variety of materials may be used for the various suction tips, preferably materials that provide sufficient friction between the suction tip and surface of the expression area to create an effective suction seal.

Figure 6:
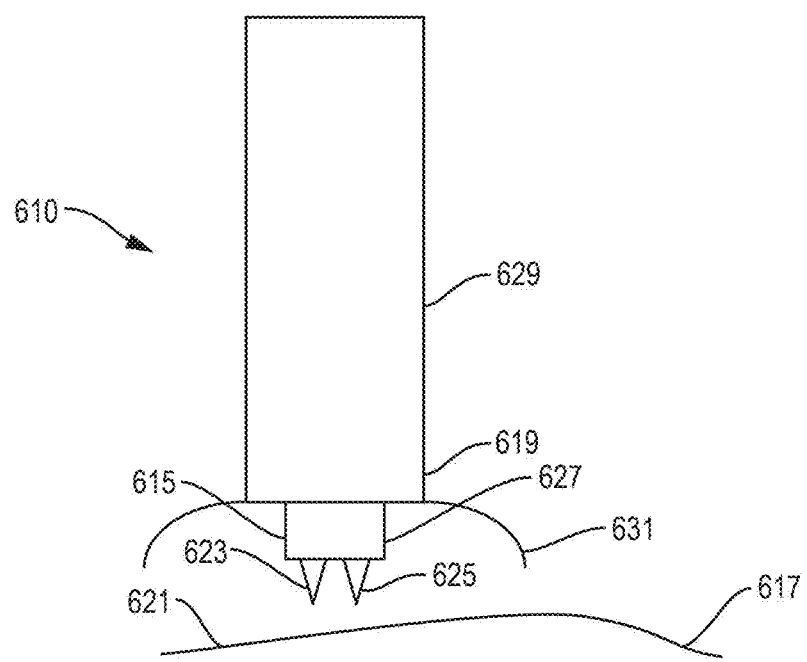
FIG. 6 is a schematic diagram of a device to promote delivery of a molecule across a cell membrane, in accordance with an embodiment of the invention.

FIG. 6 is a schematic diagram of a device 610 to promote delivery of a molecule across a cell membrane, in accordance with an embodiment of the invention. The device 610 includes an insertion component 615 configured to deliver the molecule to a region of tissue 617 surrounding the cell membranes. The device also includes a suction component 619 configured to apply suction to the surface 621 of the tissue to promote the delivery of the molecule across the cell membrane. The insertion component can include a microneedle 623 that has a coating 625 that comprises the molecule. The coating 625 can, for example, be a coating of a nucleic acid, such as a nucleic acid vaccine, for example a plasmid DNA vaccine or an mRNA vaccine, and can be a dried nucleic acid vaccine. The microneedle 623 can have a length configured to deliver the molecule to an epidermal or dermal layer of skin, such as a length of about 2 mm or less, such as between about 1 mm and about 2 mm. The suction component 619 can be configured to apply a pressure of less than about 101 kPa (1 atm) to the surface of the tissue, such as between about 1 kPa and about 50 kPa, for example between about 1 kPa and about 10 kPa, such as between about 1 kPa and about 5 kPa. The insertion component 615 can, for example, include an elongated member 627 configured to be advanced to be inserted into a surface of skin. The suction component 619 can, for example, include a surrounding elongated member 629 configured to surround the surface of the skin into which the insertion component 615 has been inserted, to apply suction. In one example, the device 610 can advance the insertion component 615, first, to insert the microneedles 623 into the tissue, such as the dermal or epidermal layer of the skin, to deliver the molecule; then the insertion component 615 can be withdrawn, and in some cases a delay time can be waited while the molecule is allowed to disperse into the tissue, for example, for less than thirty minutes, such as less than five minutes, or such as less than one minute, or another delay time; then the suction component 619 can be advanced to surround the skin into which the insertion component 615 was inserted; and then the suction component 619 can apply the suction (for example, for less than thirty minutes, such as less than five minutes, or such as less than one minute, or another suction application time, using the pressures taught above) to promote the delivery of the molecule across the cell membrane of the tissue. Suction can, for example, be applied using a variety of possible different suction techniques, such as using a suction bulb, a suction cup 631, a small pumping device, or other suction techniques. The suction cup 631 can be joined to the elongated member 629, so that it can be advanced to surround the surface of the skin into which the insertion component 615 has been inserted, to apply suction. In applying suction, excessive tissue damage should be avoided, while also delivering sufficiently low pressure to encourage permeabilization of the cell membrane. The microneedle 623 can, for example, be inserted into the skin so that the molecule is delivered to a depth of 2 mm or less under the surface of the skin, such as a depth of 1 mm or less under the surface of the skin.

Figure 7:
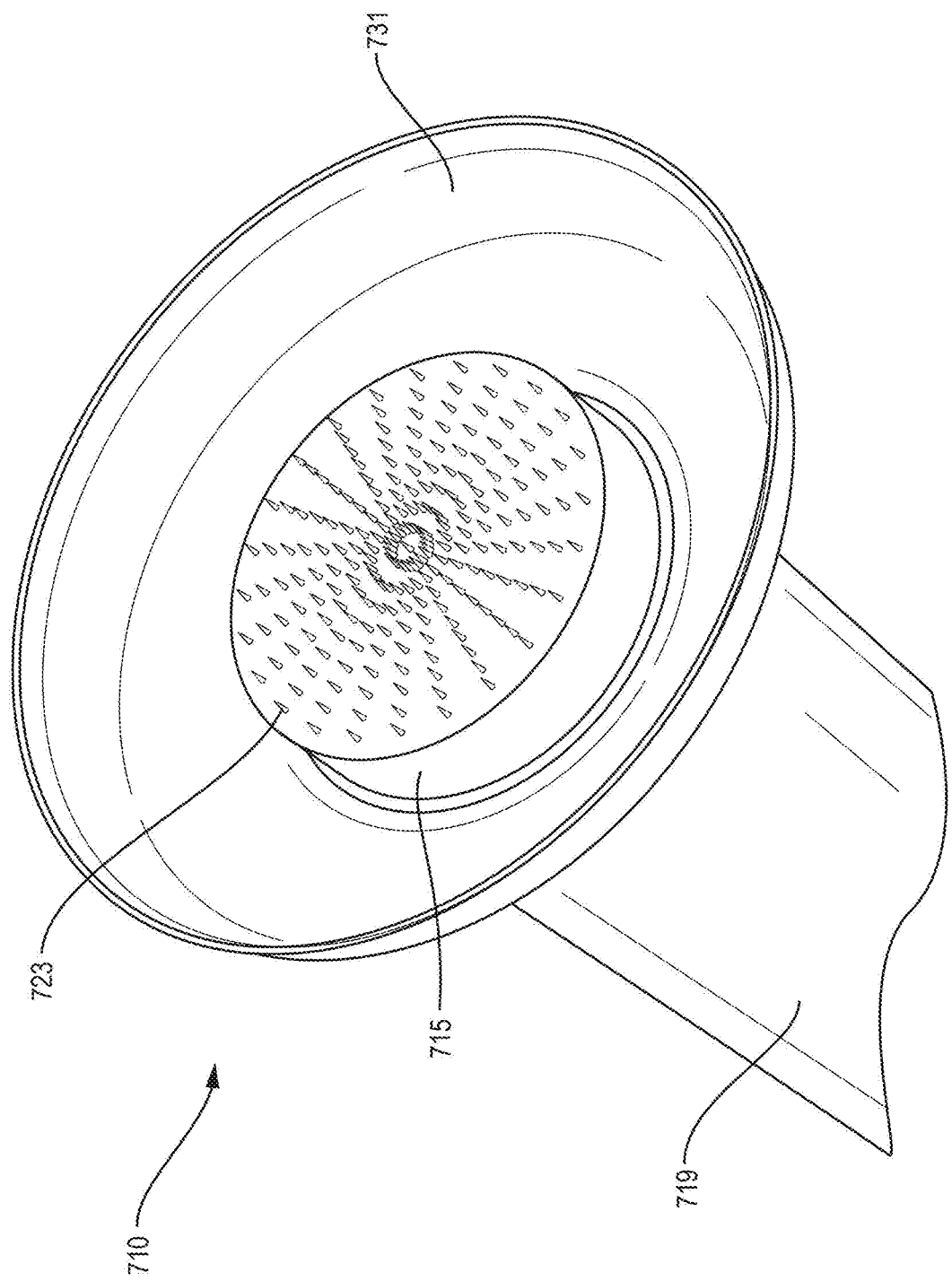
FIG. 7 is an end view schematic diagram.
Figure 8:
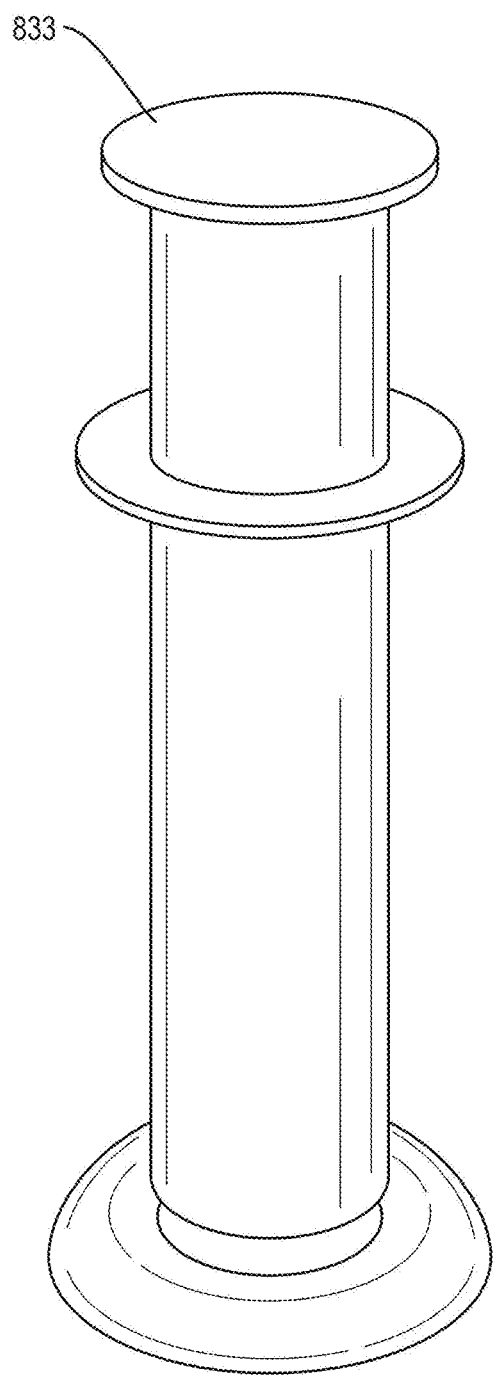
FIG. 8 is an upright view schematic diagram, of another device to promote delivery of a molecule across a cell membrane, in accordance with an embodiment of the invention.

FIG. 7 is an end view schematic diagram, and FIG. 8 is an upright view schematic diagram, of another device 710 to promote delivery of a molecule across a cell membrane, in accordance with an embodiment of the invention. In this embodiment, microneedles 723 are arranged in an array that has, for example, a radiating spoke pattern, and are advanced on the end of an insertion component 715 that is a plunger (see 833 in FIG. 8). The insertion component 715 (see FIG. 7) is surrounded by a suction cup 731 of the suction component 719.

Figure 9:
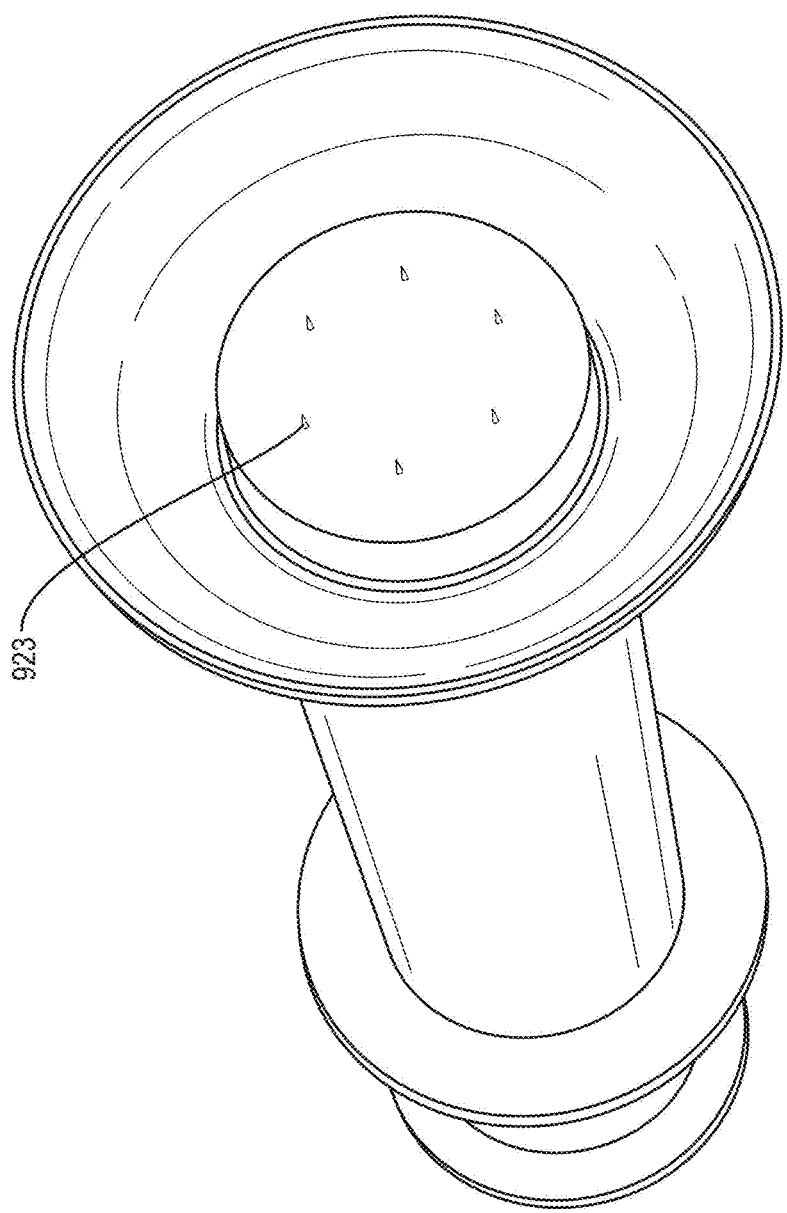
FIGS. 9 and 10 are schematic diagram of another embodiment of the device, similar to that of FIGS. 7 and 8, except that the microneedles are arranged in a hexagonal arrangement.
Figure 10:
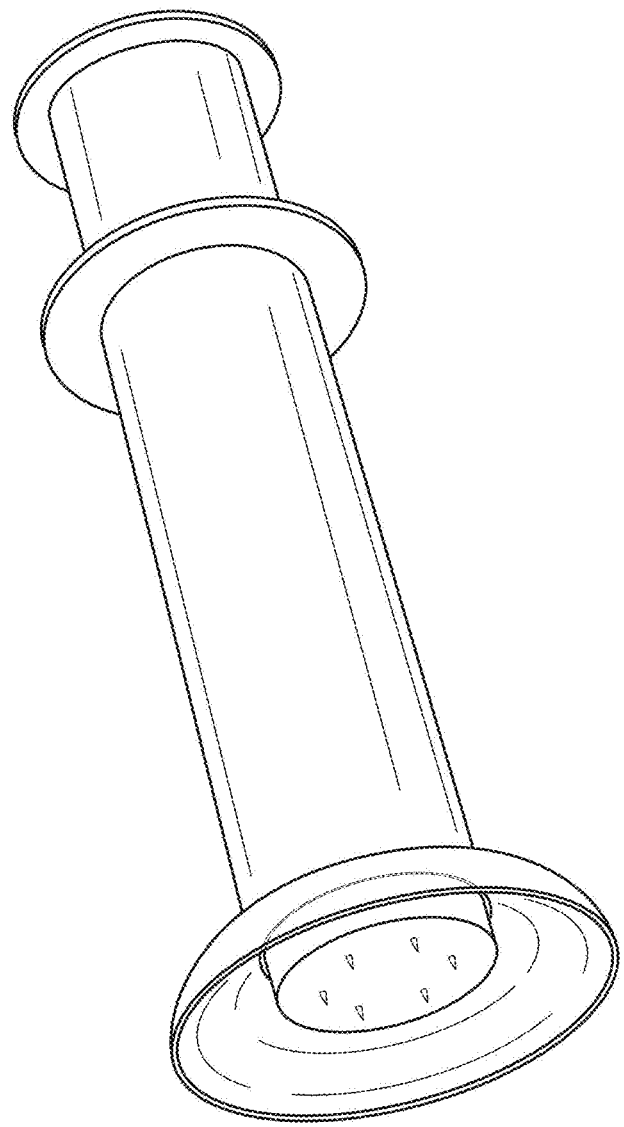

FIGS. 9 and 10 are schematic diagram of another embodiment of the device, similar to that of FIGS. 7 and 8, except that the microneedles 923 are arranged in a hexagonal arrangement. Although radiating spoke patterns and hexagonal arrangements are taught herein, other patterns of arranging microneedles can be used in accordance with embodiments of the invention.

Figure 11:
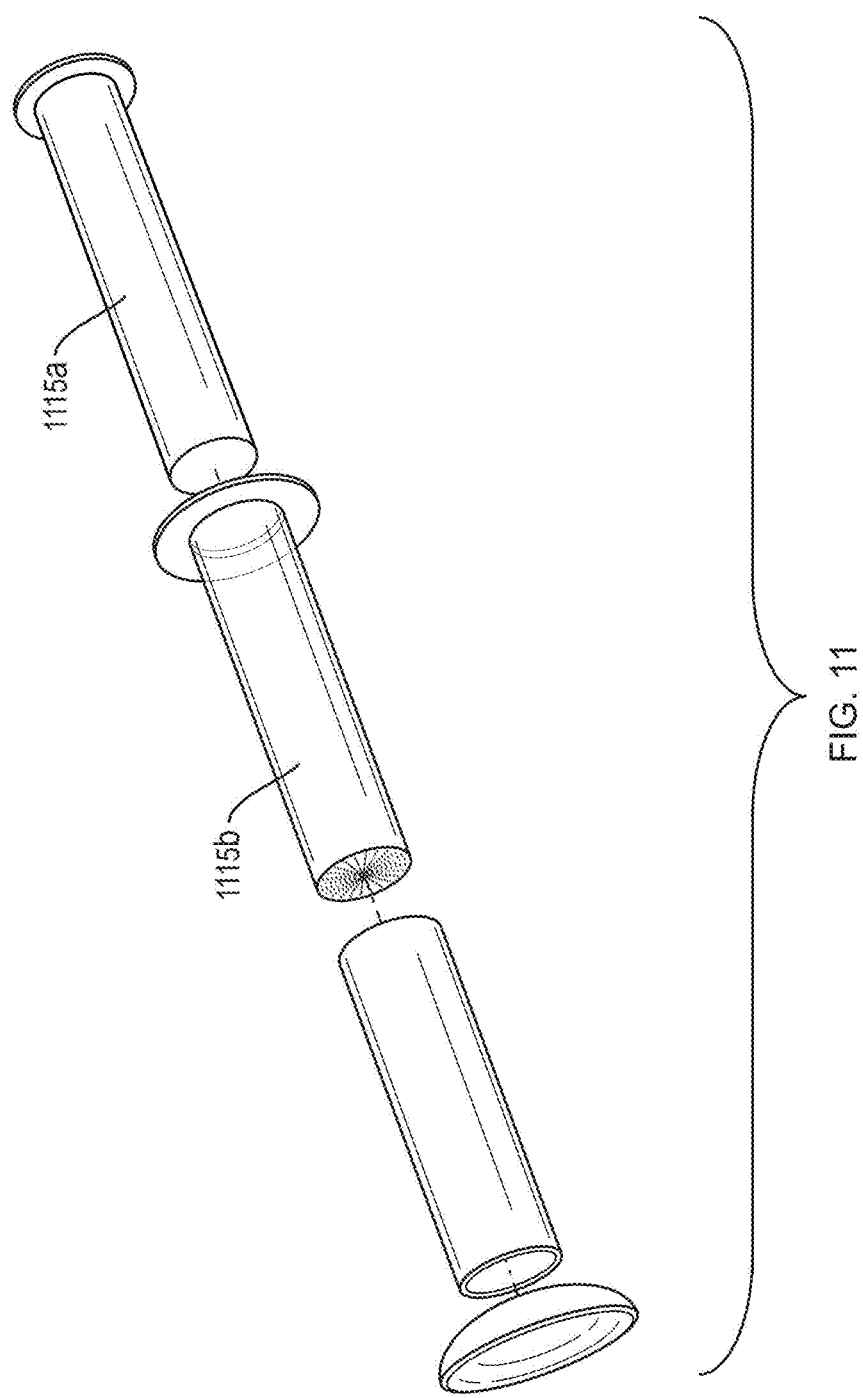
FIGS. 11-13 are schematic diagrams of a further embodiment of the device, in which the insertion component includes a syringe and hollow needles.
Figure 12:
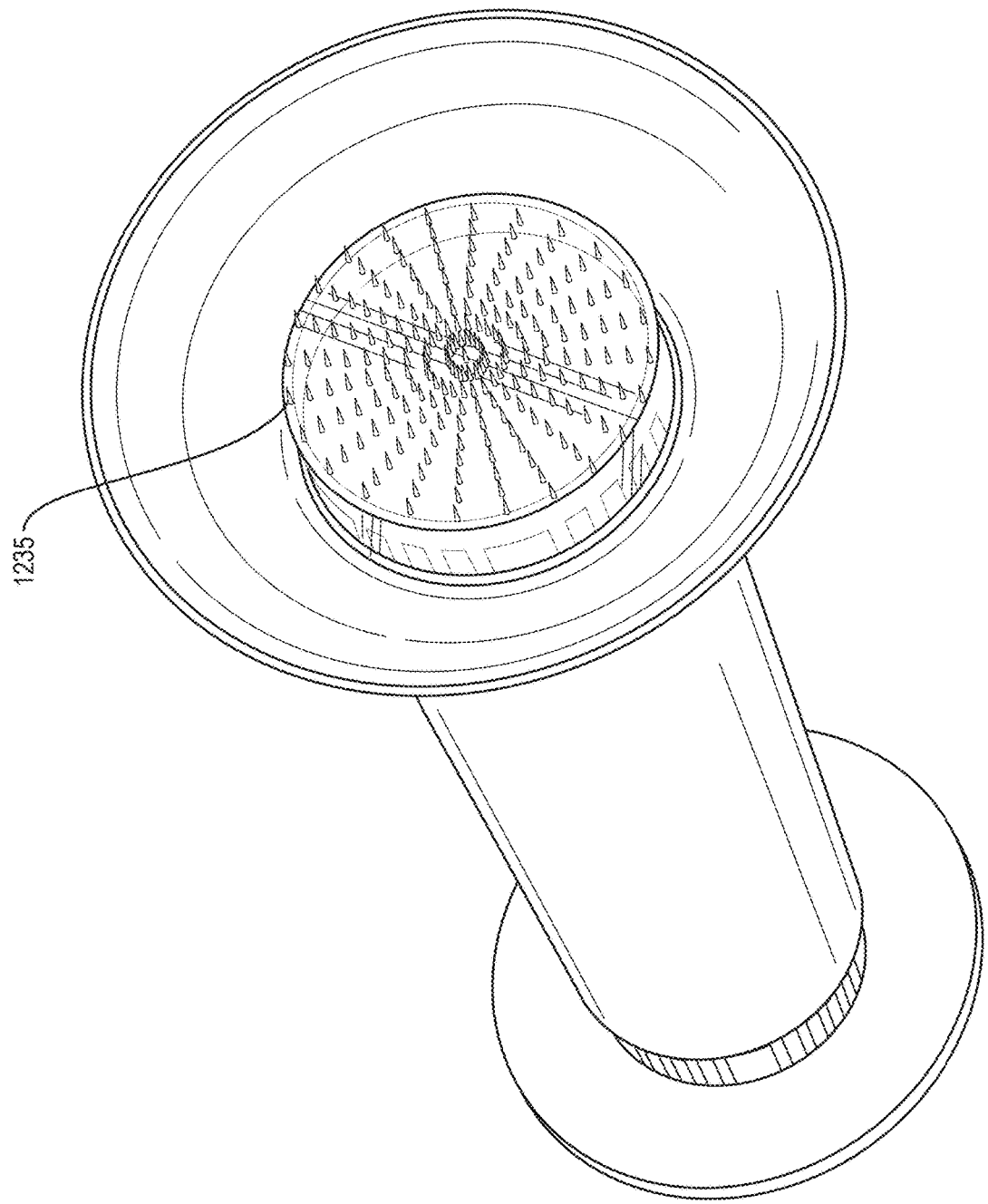
Figure 13:
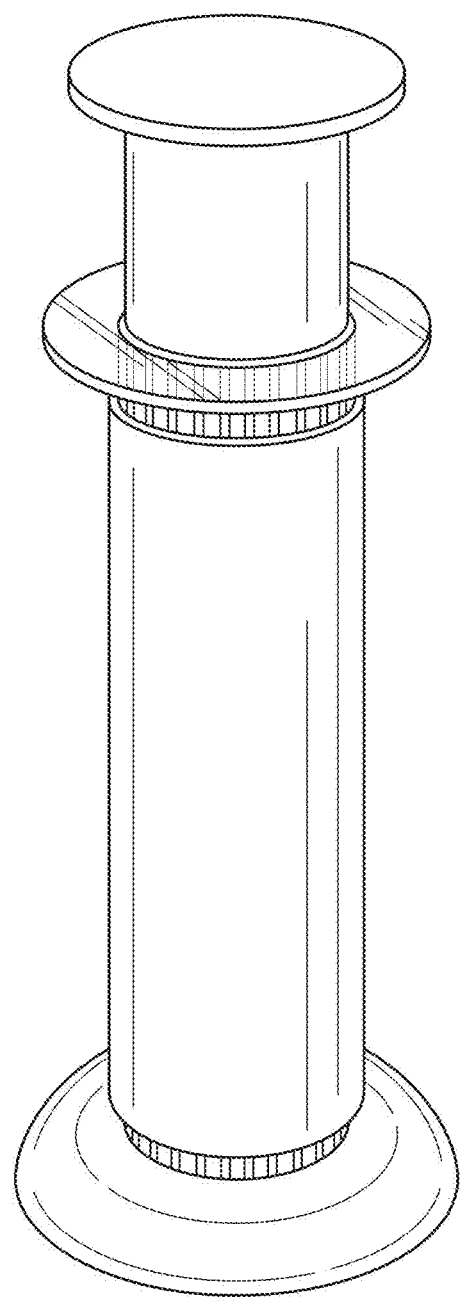

FIGS. 11-13 are schematic diagrams of a further embodiment of the device, in which the insertion component 1115*a/b* includes a syringe and hollow needles. FIG. 11 is an exploded view, FIG. 12 is an end view, and FIG. 13 is an upright view. As can be seen in FIG. 11, the syringe of the insertion component is made of two parts, 1115*a* and 1115*b*, in which the plunger part 1115*a* slides within a reservoir 1115*b*, in which a liquid that contains the molecule is positioned. By sliding plunger part 1115*a* within the reservoir 1115*b* in a distal direction towards the tissue, the liquid can be injected out of hollow needles 1235 (see FIG. 12), which are positioned at the outside distal end of the reservoir component 1115*b*.

Figure 14:
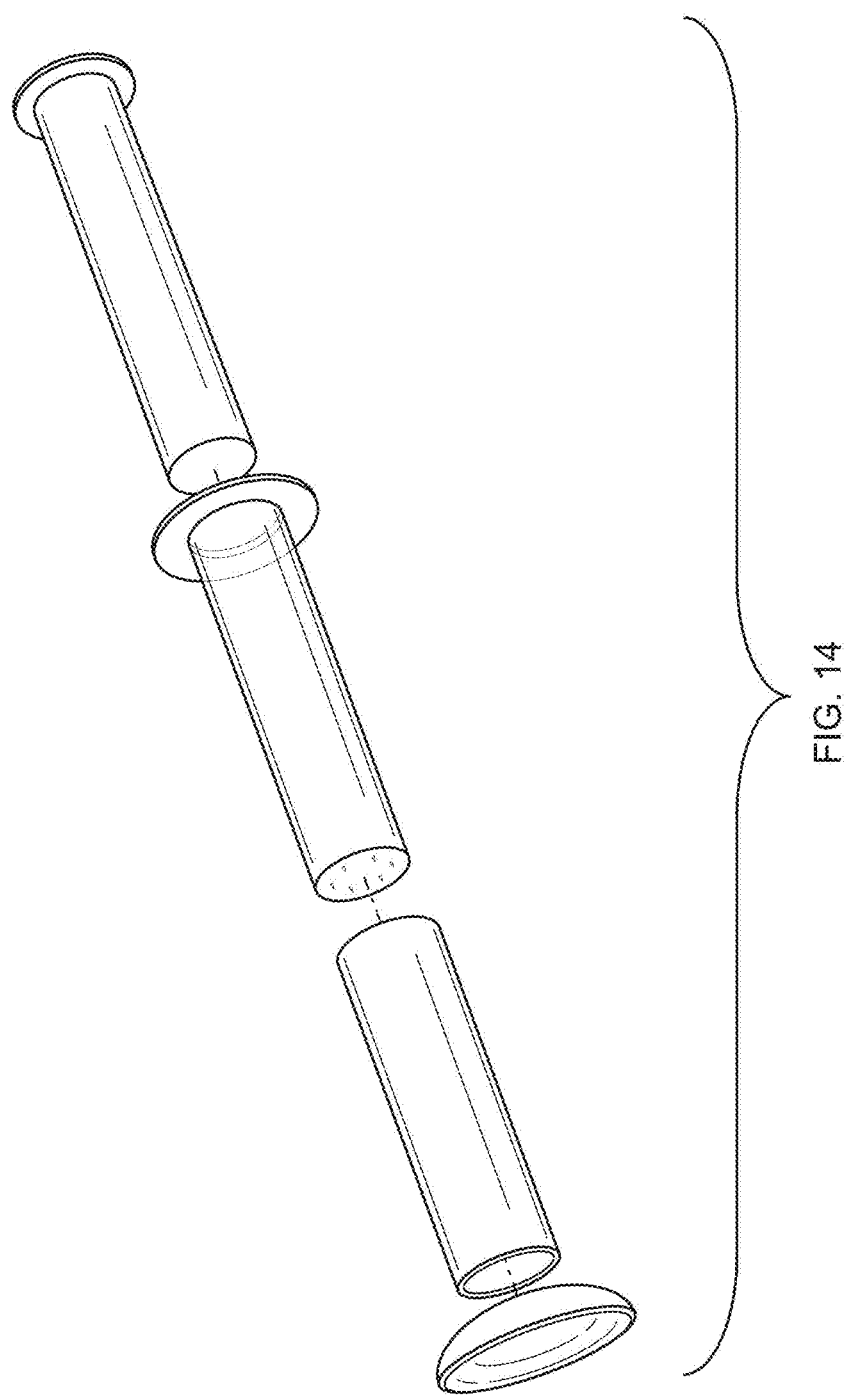
FIGS. 14 and 15 are schematic diagrams of another embodiment, similar to that of FIGS. 11-13, except that the hollow needles are arranged in a hexagonal arrangement.
Figure 15:
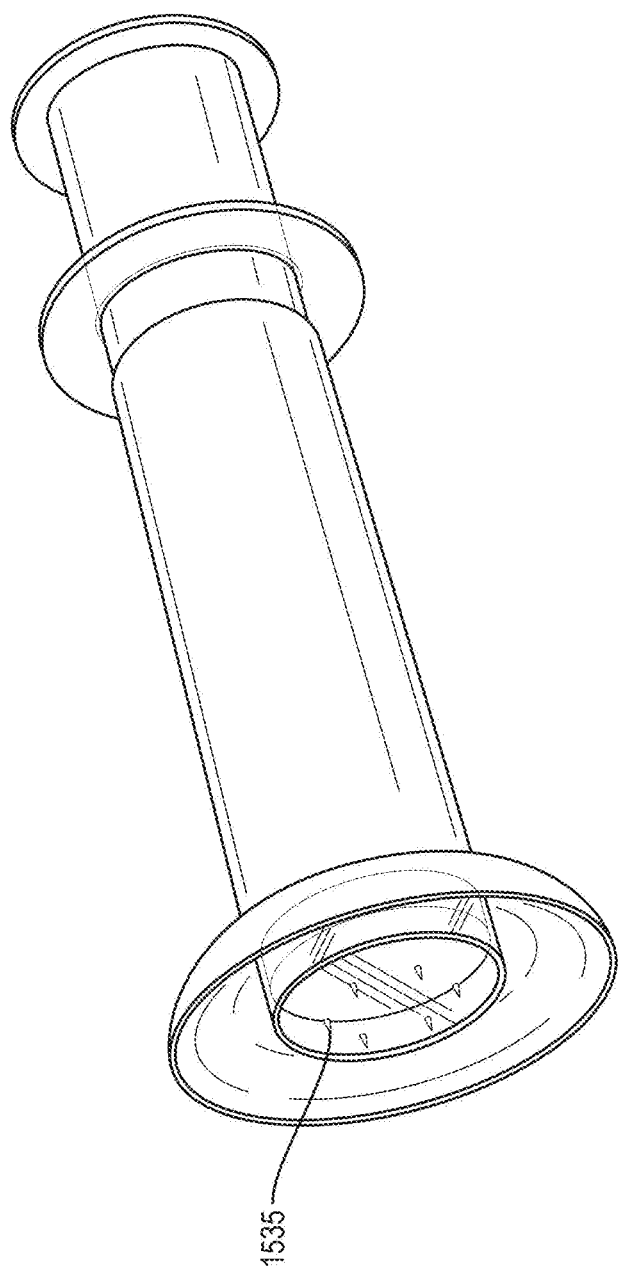

FIGS. 14 and 15 are schematic diagrams of another embodiment, similar to that of FIGS. 11-13, except that the hollow needles 1535 (see FIG. 15) are arranged in a hexagonal arrangement. FIG. 14 is an exploded view and FIG. 15 is an assembled view.

Figure 16:
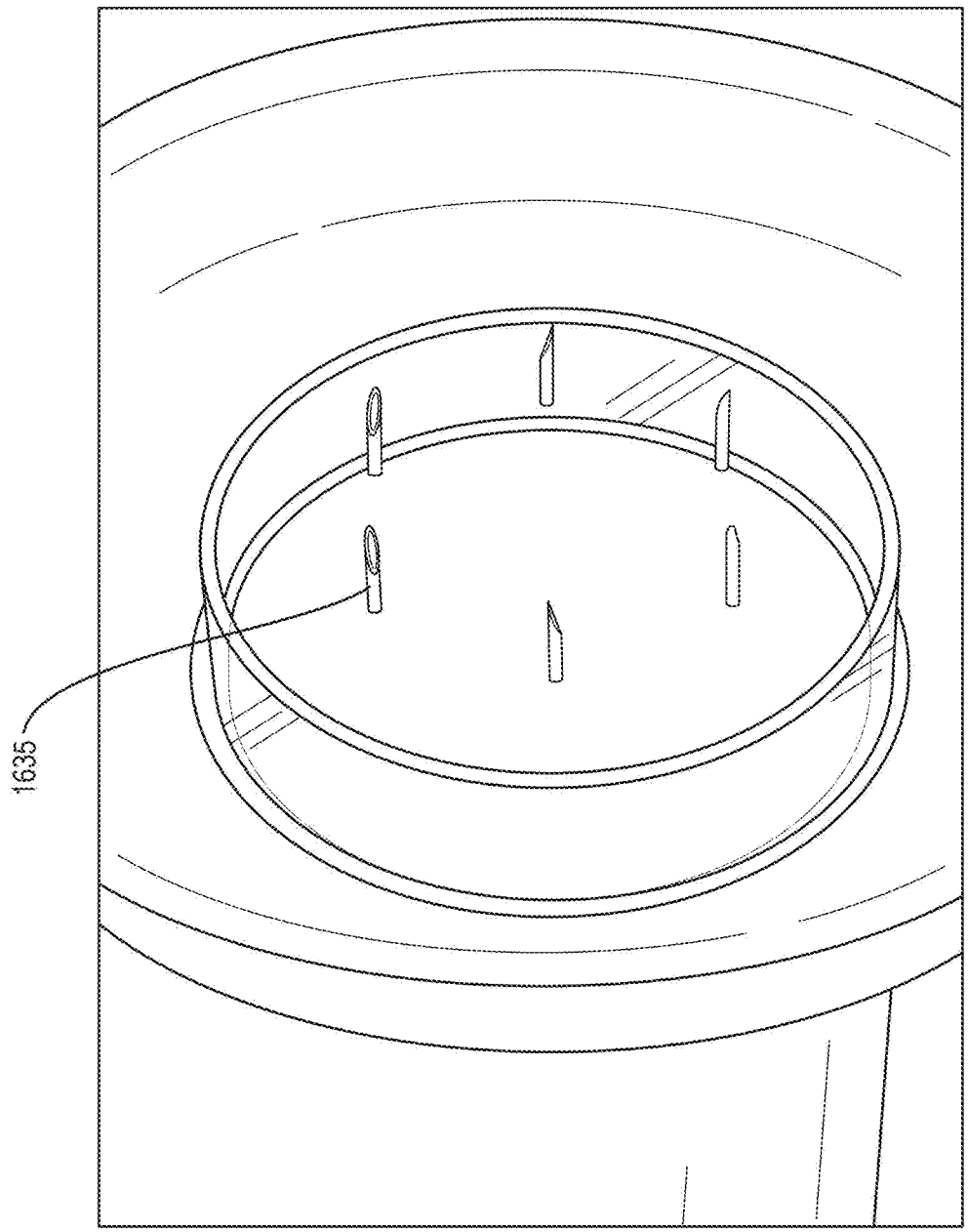
FIG. 16 is a closeup end view schematic diagram illustrating hollow needles from which a liquid containing a molecule can be injected into tissue.

FIG. 16 is a closeup end view schematic diagram illustrating hollow needles 1635 from which a liquid containing a molecule can be injected into tissue. The hollow needles 1635 can, for example, have a length configured to deliver the molecule to an epidermal or dermal layer of skin, and can have a length of about 2 mm or less.

In another embodiment, the molecule can be delivered transcutaneously by being injected through the surface of the skin (for example, using a 28 Gauge insulin syringe, containing for example 1 cc of fluid), with suction being applied as taught herein.

Although the skin has been discussed herein as an example of tissue to which a molecule can be delivered, it is also possible to use the technique to deliver to other types of tissue, including internal organs, and to solid tumors.

In some embodiments, the device and method can be without the use of electroporation or electric components. In other embodiments, the device and method can be used to supplement electroporation techniques.

The device can be used to deliver molecules of any type to tissue, including, for example: biomolecules; macromolecules, such as both synthetic macromolecules and biomolecules; and small molecules, such as drug molecules and nutrient molecules. In some embodiments, a molecule may be delivered as part of a "molecular complex." For example, mRNA may be encapsulated within a "capsule" made from lipid nanoparticles.

Definitions

As used herein, a "microneedle" is a needle that is capable of penetrating tissue, for example skin tissue, such as a needle with a tapered tip sufficiently sharp to penetrate skin tissue. Its size can vary, but can, for example, be of a length that, when inserted, places a length of the microneedle into the epidermal or dermal layer of the skin tissue; for example, its length can be less than about 2 mm, such as less than about 1 mm, or such as between about 1 mm and about 2 mm. Where a "microneedle" is referred to herein, it will be appreciated that an array of more than one microneedles can be used.

As used herein, a "biomolecule" can include a nucleic acid, a protein or any other biological molecule to be delivered in accordance with techniques taught herein, or a combination of such nucleic acids, proteins or other biological molecules. For example, the biomolecule can include one or more of: a nucleic acid or protein vaccine vector, a nucleic acid and protein vaccine vector, another vector, a nucleic acid biomolecule (for example, RNA, DNA/plasmid vector, DNA vaccine, DNA/plasmid vector vaccine) and a protein (for example, a peptide/protein, peptide/protein vaccine). In addition, a "biomolecule" can include (1) an antibody, such as a monoclonal antibody, or another ligand specific molecule, and (2) other molecules to be delivered that may have or could affect biologic and/or cellular activity.

As used herein, "nucleic acid" refers to a macromolecule composed of chains (a polymer or an oligomer) of monomeric nucleotide. The most common nucleic acids are deoxyribonucleic acid (DNA) and ribonucleic acid (RNA). It should be further understood that the present invention can be used for biomolecules containing artificial nucleic acids such as peptide nucleic acid (PNA), morpholino, locked nucleic acid (LNA), glycol nucleic acid (GNA) and threose nucleic acid (TNA), among others. In various embodiments of the present invention, nucleic acids can be derived from a variety of sources such as bacteria, virus, humans, and animals, as well as sources such as plants and fungi, among others. The source can be a pathogen. Alternatively, the source can be a synthetic organism. Nucleic acids can be genomic, extrachromosomal or synthetic. Where the term "DNA" is used herein, one of ordinary skill in the art will appreciate that the methods and devices described herein can be applied to other nucleic acids, for example, RNA or those mentioned above. In addition, the terms "nucleic acid," "polynucleotide," and "oligonucleotide" are used herein to include a polymeric form of nucleotides of any length, including, but not limited to, ribonucleotides or deoxyribonucleotides. There is no intended distinction in length between these terms. Further, these terms refer only to the primary structure of the molecule. Thus, in certain embodiments these terms can include triple-, double- and single-stranded DNA, PNA, as well as triple-, double- and single-stranded RNA. They also include modifications, such as by methylation and/or by capping, and unmodified forms of the polynucleotide. More particularly, the terms "nucleic acid," "polynucleotide," and "oligonucleotide," include polydeoxyribonucleotides (containing 2-deoxy-D-ribose), polyribonucleotides (containing D-ribose), any other type of polynucleotide which is an N- or C-glycoside of a purine or pyrimidine base, and other polymers containing nonnucleotidic backbones, for example, polyamide (e.g., peptide nucleic acids (PNAs)) and polymorpholino (commercially available from Anti-Virals, Inc., Corvallis, Oreg., U.S.A., as Neugene) polymers, and other synthetic sequence-specific nucleic acid polymers providing that the polymers contain nucleobases in a configuration which allows for base pairing and base stacking, such as is found in DNA and RNA. In addition, a "nucleic acid" can include a plasmid DNA (pDNA), such as a plasmid DNA vector.

As used herein, a "protein" is a biological molecule consisting of one or more chains of amino acids. Proteins differ from one another primarily in their sequence of amino acids, which is dictated by the nucleotide sequence of the encoding gene. A peptide is a single linear polymer chain of two or more amino acids bonded together by peptide bonds between the carboxyl and amino groups of adjacent amino acid residues; multiple peptides in a chain can be referred to as a polypeptide. Proteins can be made of one or more polypeptides. Shortly after or even during synthesis, the residues in a protein are often chemically modified by posttranslational modification, which alters the physical and chemical properties, folding, stability, activity, and ultimately, the function of the proteins. Sometimes proteins have non-peptide groups attached, which can be called prosthetic groups or cofactors.

It will be appreciated, in addition, that a biomolecule used herein can include non-natural bases and residues, for example, non-natural amino acids inserted into a biological sequence.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A device to promote delivery of a molecule across a cell membrane, the device comprising:
    a suction component configured to create a predetermined negative pressure;
    a disposable suction tip connected to the suction component and configured to form a seal along surface tissue to surround a molecule delivery site for applying the predetermined negative pressure;
    an insertion component including a microneedle including a coating that comprises the molecule, the molecule comprising a dried nucleic acid vaccine, the insertion component being configured to deliver the molecule to the molecule delivery site prior to applying the predetermined negative pressure; and
    a controller configured to apply the predetermined negative pressure for a predetermined period of time and then release the negative pressure, the controller being further configured to delay applying the predetermined negative pressure until after the insertion component is withdrawn from the surface tissue and for sufficient time after delivering the molecule to the tissue to permit hydrating and dispersing of the dried nucleic acid vaccine into the surface tissue.

2. The device of claim 1, wherein the predetermined negative pressure is between 40 kPa and 90 kPa.

3. The device of claim 1, wherein the predetermined period of time to apply the predetermined negative pressure is between 1 and 40 seconds.

4. The device of claim 1, wherein the predetermined period of time to apply the predetermined negative pressure is approximately 30 seconds.

5. The device of claim 1, wherein the disposable suction tip is further configured such that the seal forms a circle along the surface tissue.

6. The device of claim 5, wherein the circle has approximately a 6 mm diameter and a seal thickness of approximately 1 to 1.5 mm.

7. The device of claim 6, wherein the disposable suction tip is configured to form a secondary seal surrounding the molecule delivery site.

8. The device of claim 1, wherein the disposable suction tip is further configured such that the seal forms an equilateral concave decagon along the surface tissue.

9. The device of claim 1, wherein the disposable suction tip may be interchangeably substituted with disposable suction tips having various shapes and sized seals selected based on a delivery protocol of the surface tissue or the molecule delivered.

10. The device of claim 1, wherein the disposable suction tip includes an internal filter.

11. The device of claim 10, wherein the filter is configured to prevent liquids from entering the suction component.

12. The device of claim 1, wherein the nucleic acid vaccine comprises a plasmid DNA vaccine.

13. The device of claim 1, wherein the nucleic acid vaccine comprises an mRNA vaccine.

14. The device of claim 1, wherein the microneedle comprises a length configured to deliver the molecule to an epidermal or dermal layer of skin.

15. The device of claim 1, wherein the coating comprises a matrix material.

16. The device of claim 15, wherein the matrix material comprises at least one of: a polysaccharide, a protein, an enzyme, and a water soluble polymer.

17. The device of claim 1, wherein the microneedle comprises a length of about 2 mm or less.

18. The device of claim 1, wherein, after releasing the negative pressure, the controller is configured to re-apply negative pressure for a second period of time and then release the re-applied negative pressure.

19. The device of claim 1, wherein the molecule is delivered as part of a molecular complex.

20. The device of claim 1, wherein the time after delivering the molecule to the tissue is less than one minute.

* * * * *